(12) United States Patent
Kinebuchi

(10) Patent No.: US 7,113,151 B2
(45) Date of Patent: Sep. 26, 2006

(54) HEAD-MOUNTED IMAGE DISPLAY DEVICE AND DATA PROCESSING APPARATUS INCLUDING THE SAME

(75) Inventor: Tadashi Kinebuchi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 199 days.

(21) Appl. No.: 09/928,383

(22) Filed: Aug. 13, 2001

(65) Prior Publication Data

US 2002/0126066 A1 Sep. 12, 2002

Related U.S. Application Data

(62) Division of application No. 09/330,397, filed on Jun. 11, 1999, now Pat. No. 6,320,559, which is a division of application No. 08/582,997, filed as application No. PCT/JP94/01340 on Aug. 12, 1994, now Pat. No. 5,977,935.

(30) Foreign Application Priority Data

| Aug. 12, 1993 | (JP) | 5-200863 |
| Nov. 17, 1993 | (JP) | 5-288459 |
| Nov. 19, 1993 | (JP) | 5-290952 |
| Nov. 19, 1993 | (JP) | 5-290953 |
| Nov. 19, 1993 | (JP) | 5-290955 |
| Nov. 29, 1993 | (JP) | 5-298478 |
| Dec. 24, 1993 | (JP) | 5-328586 |
| Dec. 24, 1993 | (JP) | 5-328594 |

(51) Int. Cl.
*G09G 5/00* (2006.01)

(52) U.S. Cl. .............. 345/8; 345/156; 345/168
(58) Field of Classification Search ........... 345/7, 345/8, 9, 156, 158, 168, 172, 157, 169, 173; 715/773; 340/980; 348/78, 115; 359/13, 630, 359/631

See application file for complete search history.

(56) References Cited

U.S. PATENT DOCUMENTS

| 4,757,714 A | 7/1988 | Purdy et al. ............ 73/597 |
| 4,984,179 A | 1/1991 | Waldern ............... 364/514 |
| 5,015,188 A | 5/1991 | Pellosie et al. ........... 434/38 |

(Continued)

FOREIGN PATENT DOCUMENTS

| EP | 0344881 | 12/1989 |
| EP | 0460983 | 12/1991 |
| EP | 0479422 A2 | 4/1992 |

(Continued)

OTHER PUBLICATIONS

Merchant, J. "Fixation Point Measurement." Optical Engineering, vol. 13, No. 4 (Jul. 1994), pp. 339–342.
Epworth, R. "Eye Movement . . . " ICL Technical Journal, 7 (1990) Nov., 2, Oxford G.B., pp. 384–411.

(Continued)

*Primary Examiner*—Dennis-Doon Chow
(74) *Attorney, Agent, or Firm*—Ladas & Parry LLP

(57) ABSTRACT

A head-mounted image display device with a good operability and a data processing apparatus including such a display device. A head-mounted image display device wherein a liquid crystal panel and an enlarging optical system are crystal display panel through the enlarging optical system housed in a frame and wherein images generated on the liquid are visible in the field of view in front of the frame comprises a first direction detection means (107) disposed in part of the frame (101) for detecting the direction of the user's head; an observation point detection means (109) disposed in part of the frame for detecting the user's line of sight; a trigger input means (4) for transmitting trigger signals; and an image generation means (3, 105) for controlling images generated on the liquid crystal display panel based on signals from the first direction detection, observation point detection, and trigger input means.

2 Claims, 39 Drawing Sheets

U.S. PATENT DOCUMENTS

| | | | |
|---|---|---|---|
| 5,034,809 A | 7/1991 | Katoh | 358/88 |
| 5,130,794 A | 7/1992 | Ritchey | 358/87 |
| 5,208,417 A | 5/1993 | Langer et al. | 340/705 |
| 5,214,466 A | 5/1993 | Nagano et al. | 354/402 |
| 5,381,158 A * | 1/1995 | Takahara et al. | 345/156 |
| 5,450,596 A | 9/1995 | Felsenstein | 395/800 |
| 5,751,260 A | 5/1998 | Nappi et al. | 345/8 |
| 5,767,842 A * | 6/1998 | Korth | 345/168 |
| 5,969,698 A * | 10/1999 | Richard et al. | 345/7 |
| 6,061,064 A | 5/2000 | Reichlen | 345/8 |
| 6,094,182 A | 7/2000 | Maguire, Jr. | 345/8 |

FOREIGN PATENT DOCUMENTS

| | | |
|---|---|---|
| EP | 0479605 | 4/1992 |
| EP | 0537945 | 4/1993 |
| GB | 2259213 | 3/1993 |
| JP | 3188777 | 8/1991 |
| JP | 3289615 | 12/1991 |
| JP | 4263283 | 9/1992 |
| JP | 5100192 | 4/1993 |
| JP | 05189484 | 7/1993 |
| JP | 678341 | 3/1994 |
| WO | 9104508 | 4/1991 |

OTHER PUBLICATIONS

English Abstract of EP 0460983 dated Dec. 11, 1991.
English Abstract of JP 678341 dated Mar. 18, 1994.
English Abstract of JP 3289615 dated Dec. 19, 1991.
English Abstract of JP 3188777 dated Aug. 16, 1991.
English Abstract of JP 4263283 dated Sep. 18, 1991.
English Abstract of JP 5100192 dated Apr. 23, 1993.

* cited by examiner

FIG. 42
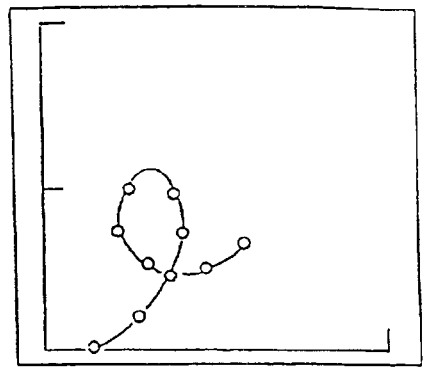
(b)
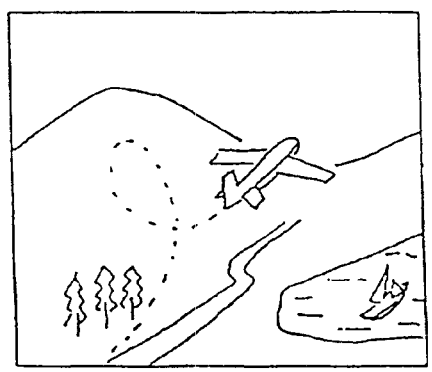
(a)
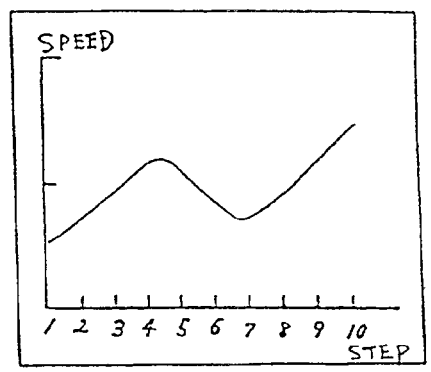
(c)
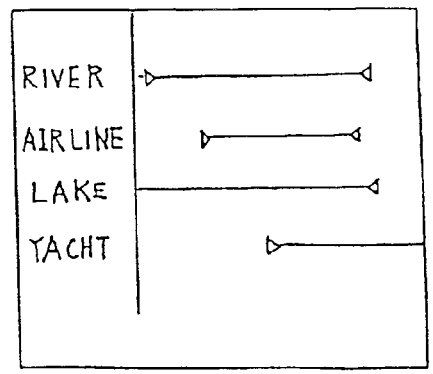
(d)

HEAD-MOUNTED IMAGE DISPLAY DEVICE AND DATA PROCESSING APPARATUS INCLUDING THE SAME

This application is a divisional of application Ser. No. 09/330,397 filed on Jun. 11, 1999 now U.S. Pat. No. 6,320,559, which is a divisional of application Ser. No. 08/582,997 filed Feb. 12, 1996, now U.S. Pat. No. 5,977,935 which is International Application PCT/JP94/01340 filed on Aug. 12, 1994 and which designated the U.S., and was not published in English, claims the benefit thereof and incorporates the same by reference.

BACKGROUND OF THE INVENTION

1. Field of the Invention

The present invention relates to a head-mounted image display device for displaying images on a screen showing a virtual space and to a data processing apparatus including this device.

2. Description of the Prior Art

The design of electronic circuits or experiment thereon requires materials such as data sheets due to the need to confirm the specifications of parts to be used. In this case, the materials are scattered on and around the designer's desk, thereby limiting the working space or hindering the designer from finding required materials quickly. This reduces the working efficiency.

To carry out design efficiently, computer aided engineering (CAE) for working out designs using computers has been introduced. That is, a paperless design environment has been established in which, for example, materials such as data sheets are registered in a computer to enable them to be displayed and referenced on the screen of the display as required. The above inconveniences have thus partly been eliminated.

If, however, a large number of parts are to be used and a large number of materials must be referenced at the same time, although several windows can be opened on the screen to display different materials in the different windows, the windows must sometimes overlap each other if a large number of windows must be used simultaneously due to the physically limited size and resolution of the CRT display for displaying information. As a result, the amount of information that can be referenced at the same time is limited, and the efficiency provided by the introduction of CAE is thus limited; in some cases, it is faster to find required materials among those scattered on and around the table as described above.

The working efficiency is also reduced in the maintenance or repair of an installed apparatus, wherein the operator must carry out such an operation while referencing instruction manuals and wherein because the surroundings are in disorder, the operator cannot place the manuals in positions in which they can be referenced appropriately. Under such conditions, however, it is further difficult to place a CRT display close to the operator, and the introduction of CAE is impossible. Thus, no other appropriate solutions were available.

Several methods of mounting a display apparatus on the operator's head and displaying information from materials thereon have thus been proposed.

Published Unexamined Patent Application No. 5-100192 describes a method of displaying screens from electronics such as word processors on a spectacle-like display, but this is only a spectacle-shaped variation of conventional displays and is not suited to the presentation of a large number of materials. Published Unexamined Patent Application No. 4-263283 proposes a portable virtual reality apparatus, but this simply provides an artificial reality apparatus and is not suited to the manipulation of displayed data.

In addition, for conventional head-mounted image display devices, several problems arising from the need to alternatively view a virtual image on the liquid crystal display and the corresponding image on the external keyboard due to the large difference in image quality between these images, have been pointed out. To solve this problem, some conventional techniques cause a display image and the corresponding external image to overlap each other. Head-mounted image display devices of this type, however, also have problems. For example, in such apparatuses, the visibility is very bad because external images are simply caused to overlap the corresponding display images, and alternatively viewing different images may strain the operator's eyes.

In addition, in head-mounted image display devices, when, four example, data is input to a word processor, keys to be pressed must be confirmed while viewing a display image, so the external keyboard must be checked while watching the display image.

To solve this problem, a means for switching between an external image and the corresponding image from an arithmetic operational device may be provided, or a configuration that enables the use of part of the field of view for watching the display while using the other part for checking the exterior may be provided, as proposed in Published Unexamined Patent Application No. 5-100192. In this case, however, since data must be input while using a particular part of the field of view to check the input device, mounting the image display device on the operator's head eliminates the freedom of the operator's inputting position, and long time work thus results in a significant fatigue. In addition, if a keyboard is used as an input device, the input operation is very difficult when the keys are larger than the tips of the operator's fingers, so the limit of the practical size of portable terminals depends on the size of the keyboard. Furthermore, due to the fixed arrangement of keys in conventional keyboards, optimal key arrangements for various applications are not available. In this information-oriented society, more and more attention is being paid to multimedia applications, so people must often deal with data in which motion and still pictures are mixed. Under these circumstances, the need of complicated procedures for creating motion pictures hinders people without expertise from providing adequate expressions using multiple media effectively. For hypermedia applications, HyperCard commercially available from Apple Co., Ltd is popular, but requires a large number of mouse clicks, thereby possibly resulting in mistakes in clicking positions.

For movie postproduction processes for processing, synthesizing, and editing movie materials, a large amount of time is required to complete the process due to the need to accurately carry out complex procedures according to pre-calculations, and the flexibility of these processes is limited; it is impossible to test various combinations of images during the process.

In addition, if a head-mounted image display device is used, only the person wearing the device can view image display information output from a data processing apparatus. If a plurality of people have to view image display information output from the data processing apparatus, then:

(1) these people must use a single head-mounted image display device in turn, or (2) another data processing apparatus with a CRT display must be provided.

In this manner, a plurality of devices may be required according to a particular purpose and usage.

Attempts are being made to reduce the size of computers and word processors, and the utilization of portable data processing apparatuses is increasing. Such portable data processing apparatuses ordinarily include an open type display that is opened in use. However, with the further reduction of the size of portable data processing apparatuses, the extension of the range within which such devices can be used, and the increase in demand for functions of publicly creating confidential documents, the use of head-mounted image display devices has been proposed. As in Published Unexamined Patent Application No. 5-100192, such apparatuses comprise an arithmetic processing device and a head-mounted image display device to display screen information output from the arithmetic operation device, through the head-mounted image display device as enlarged virtual images. In such conventional structures, the arithmetic operation device and the head-mounted image display device are always separated from each other, they must be carried separately, resulting in poor portability despite their reduced sizes. Even if the head-mounted image display device is carried in an outer sheath case, handling becomes cumbersome, and faults are likely to occur.

BRIEF SUMMARY OF THE INVENTION

It is an objective of this invention to provide a head-mounted image display device suitable to efficient design, experiment, maintenance, and repairs.

It is another objective of this invention to provide a head-mounted image display device that has good portability and visibility and that does not affect the user's health.

It is yet another objective of this invention to provide a head-mounted image display device that enables the operator to input data in a natural position without depending on the size of an input device.

It is yet another objective of this invention to provide a head-mounted image display device that can be used for multimedia applications and that enables the user to check both an image display section and displayed information on the attributes of a displayed image simply by changing the direction of the field of view when editing still and motion pictures.

It is still another objective of this invention to provide a head-mounted image display device that uses as an image retrieval method that is complicated when used with hypermedia applications a method for displaying retrieved attributes based on time series or hierarchies and that reduces mistakes attributable to the image retrieval method simply by switching the direction of the field of view between a first display area and a second display area.

It is still another objective of this invention to provide a head-mounted image display device that enables the three-dimensional display of information displayed in the second display area the amount of which varies with changes in space or time by changing the parallax of the operator's eyes, thereby reducing mistakes in inputting hierarchical data.

It is still another objective of this invention to provide a head-mounted image display device that can express even minor positional relationships in an image during edition in imaginative movie production methods in which voices are supplementarily input to process and edit movie materials and that in the edition of motion pictures, can express conditions based on time series such as partial acceleration and deceleration in such a way that they look like real conditions.

It is still another objective of this invention to provide a data processing apparatus that can simply switch a display means between a head-mounted image display device and a screen or the like as required to display thereon image display information output from the data processing apparatus main body.

It is still another objective of this invention to provide a data processing apparatus comprising a head-mounted image display device that is portable and easy to handle.

(A) A head-mounted image display device according to one aspect of this invention wherein a liquid crystal panel and an enlarging optical system are housed in a frame and wherein images generated on the liquid crystal display panel through the enlarging optical system are visible in the field of view in front of the frame, comprises a first direction detection means disposed in part of the frame for detecting the direction of the user's head, an observation point detection means disposed in part of the frame for detecting the user's line of sight, a trigger input means for transmitting trigger signals, and an image generation means for controlling images generated on the liquid crystal display panel based on signals from the first direction detection, observation point detection, and trigger input means.

According to another aspect of this invention, the above head-mounted image display device has a second direction detection means mounted on the user for detecting the direction of the user's body to transmit the detection signal to the image generation means.

According to yet another aspect of this invention, in the above head-mounted image display device, the image generation means drives the liquid crystal display panel to display an image on a virtual screen as a virtual image, selects and identifies an arbitrary image from the plurality of displayed images based on the output of the observation point and direction detection means, and specifies the identified image as those to be manipulated on the basis of the output of the trigger input means.

According to still another aspect of this invention, in the above head-mounted image display device, the image generation means moves the arbitrary selected image to the positions on the virtual screen which are determined on the basis of the output of the observation point and direction detection means and stops the movement in response to the output of the trigger input means.

With the above configuration, in designing circuits or experimenting thereon, this invention can display on a virtual screen fixed to the space those materials such as data sheets which are used to confirm the specifications of parts to be used, thereby preventing the working space from being limited by a large number of materials to avoid the reduction of efficiency even when a large number of parts must be used.

In carrying out the maintenance or repair of an installed apparatus, since the locational relationship with the operator can be displayed on a fixed virtual screen, efficient operations are ensured even if there is no appropriate place in which manuals can be put.

Furthermore, due to the ability of this invention to freely move arbitrary virtual screens, required screens can be moved to positions in which images can be seen most clearly, thereby eliminating the need for the operator to assume an unnatural posture.

The movement of virtual screens does not require the use of the operator's hands, so they can be solely used for operations.

(B) A head-mounted image display device according to another aspect of this invention wherein a liquid crystal panel and an enlarging optical system are housed in a frame and wherein images generated on the liquid crystal display panel through the enlarging optical system are visible in the field of view in front of the frame, has a screen disposed in the direction in which enlarged virtual images generated by the enlarging optical system are formed.

According to another aspect of this invention, the above head-mounted image display device further has a synthesizing optical means for synthesizing an image showing the exterior of the user and an image on the liquid crystal display panel.

According to yet another aspect of this invention, the above head-mounted image display device employs part of an outer sheath case for a portable computer as a screen.

With the above constitution, this invention implements an image display device that has good portability and visibility and that does not affect the operator's health by providing an optical system for synthesizing an image on the liquid crystal display and an image of the exterior and also providing a screen in the direction in which images on the liquid crystal display are formed, or by using a single eye-type head-mounted image liquid crystal display device with a screen disposed in the direction in which vertual images on the liquid crystal display are formed. A portable computer that has good portability and visibility and that does not affect the operator's health can also be implemented by employing part of an outer sheath cover of the computer as a screen.

(C) A head-mounted image display device according to yet another aspect of this invention wherein a liquid crystal panel and an enlarging optical system are housed in a frame and wherein images generated on the liquid crystal display panel through the enlarging optical system are visible in the field of view in front of the frame, has an input device with a sensor for inputting signals and an image generation means for assigning input keys to locational information from the input device and synthesizing on/off information on the input keys and the results of arithmetic operations to allow the liquid crystal display panel to generate synthesized images.

According to yet another aspect of this invention, the above head-mounted image display device displays input information on part of the display screen and the results of arithmetic operations on the other part.

With the above configuration, this invention enables the user to input data in a natural position without viewing the input device, and to check the conditions of the input device without substantially moving the user's field of view. In addition, since a key assignment means in the arithmetic operation device executes key assignment, an optimal keyboard for a particular application can be provided regardless of the number of keys in the input device, and various interface screens can be displayed in a virtual keyboard display section. Furthermore, the input device does not require the size and arrangement of input keys to be determined in advance, so the use of a small tablet enables a small portable terminal to be realized.

(D) A head-mounted image display device according to still another aspect of this invention wherein a liquid crystal panel and an enlarging optical system are housed in a frame and wherein images generated on the liquid crystal display panel through the enlarging optical system are visible in the field of view in front of the frame, has a location detection means for detecting the field of view in the horizontal or vertical directions, a voice input means joined with the frame using a flexible joint, and an image generation means for controlling images generated on the liquid crystal display panel based on the location detection and voice input means.

According to still another aspect of this invention, in the above head-mounted image display device, the voice input means is composed of a small microphone that enables unspecified speakers to input voices thereto.

In addition, a head-mounted image display device according to still another aspect of this invention wherein a liquid crystal panel and an enlarging optical system are housed in a frame and wherein images generated on the liquid crystal display panel through the enlarging optical system are visible in the field of view in front of the frame, has a location detection means for detecting the field of view in the horizontal or vertical directions and an image generation means for segmenting the display area into a first display area for displaying images and a second display area for displaying attributes of an image and switching between the first and second display areas based on the output of the location detection means.

According to still another aspect of this invention, in the above head-mounted image display device, the image generation means can switch between the first and second display areas based on the output of the location detection means, and controls attribute data shown in the second display area according to voice input signals.

In addition, a head-mounted image display device according to still another aspect of this invention wherein a liquid crystal display panel and an enlarging optical system are housed in a frame and wherein images generated on the liquid crystal display panel through the enlarging optical system are visible in the field of view in front of the frame, has a location detection means for detecting the field of view in the horizontal or vertical directions and an image generation means for segmenting the display area into a first display area for displaying images and a second display area for displaying attributes of an image and switching between the first and second display areas based on the output of the location detection means to display in the second display area for displaying attributes of an image a geometry or operation model to be incorporated in the first display area.

According to still another aspect of this invention, in the above head-mounted image display device, geometrical data or camera work to be incorporated in the first display area is displayed in the second display area.

According to still another aspect of this invention, in the above head-mounted image display device, space-time area data to be incorporated in the first display area is displayed in the second display area.

According to still another aspect of this invention, in the above head-mounted image display device, space-time area data to be incorporated in the first display area is three-dimensionally displayed in the second display area with a parallax provided therein.

In addition, a data processing apparatus according to still another aspect of this invention comprises a head-mounted image display device wherein a liquid crystal display panel and an enlarging optical system are housed in a frame and wherein images generated on the liquid crystal display panel through the enlarging optical system are visible in the field of view in front of the frame; and a main body including a central processing unit and a keyboard, with the image display device and the main body connected together via a connector.

According to still another aspect of this invention, in the above data processing apparatus, the main body has a socket in which the liquid crystal display panel is mounted, the liquid crystal display panel mounted in the socket and the liquid crystal display panel provided in the head-mounted image display device are each detachably constituted, and the liquid crystal display panels are also configured so as to be shared by the main body and the head-mounted image display device.

With the above constitution, this invention enables the operator to precisely adjust the sizes of images and relative relationships among them during edition while viewing the images, by providing the location detection means for detecting the field of view in the horizontal or vertical directions and the voice input means joined with the frame using a flexible joint.

Since the voice input means comprises a small microphone that enables unspecified speakers to input voices thereto, any user can wear this means. Furthermore, by inputting a form of voice input processing using WordSpotting on a neuro-computer, mistakes in input procedures are somewhat compensated for because associated keywords can be recognized on the basis of certain probabilistic determination, thereby enabling edition to be executed without the need to memorize all the commands.

Since the location detection means can switch between the first and second display areas, the display area can be spatially classified into a plurality of pages, thereby enabling the overall picture to be confirmed during edition, in contrast to conventional techniques wherein an image and its attributes are displayed in a single page constituting a display area.

Since the second display area for displaying attributes of an image displays a geometry or operation model to be incorporated in the first display area, it can display not only image materials required during edition but also materials used during interactive input, and symbols displayed in the second display area can be input by clicking on them with a mouse, thereby reducing operational mistakes.

Since the second display area for displaying attributes of an image displays space-time area data to be incorporated in the first display area, information that varies with the lapse of time can be processed appropriately.

Since the second display area for displaying attributes of an image three-dimensionally displays hierarchical and space-time area data to be incorporated in the first display area with a parallax provided therein, the depth of images in the first display area and spatial-temporal area data can be edited and processed appropriately.

Although the above display method has been described in conjunction with an embodiment that mainly displays images and in which an image is displayed to the right of its attributes, this invention is not limited to this arrangement and attribute data may be located to the left of the image or over or under the image.

(E) A data processing apparatus according to still another aspect of this invention comprises a head-mounted image display device wherein a liquid crystal display panel and an enlarging optical system are housed in a frame and wherein images generated on the liquid crystal display panel through the enlarging optical system are visible in the field of view in front of the frame; and a main body including a central processing unit and a keyboard, with the image display device and the main body connected together via a connector.

According to still another aspect of this invention, in the above data processing apparatus, the connector has a power supply for driving the image display device and an information transmission means for transmitting image display information to the image display device.

According to still another aspect of this invention, in the above data processing apparatus, the main body has a socket in which the liquid crystal display panel is mounted, the liquid crystal display panel mounted in the socket and the liquid crystal display panel provided in the head-mounted image display device are each detachably constituted, and the liquid crystal display panels are also configured so as to be shared by the main body and the head-mounted image display device.

With the above configuration, this invention enables the display means to be switched simply and quickly as required. Images displayed on the head-mounted image display or screen or the like are larger than those on conventional displays, so the screen in this invention has a large capacity. Furthermore, since a single device can accommodate a plurality of usages, it is not necessary to use different devices for different purposes.

Conventional apparatuses require two cords for supplying power to the image display device and for transmitting image display information to the same device because the main body and the image display device each hold a power supply. In this invention, however, the connector includes the power supply for driving the image display device and the information transmission means for transmitting image display information to the image display device, as described above, so a single cord can be used to supply power to the image display device as well as to transmit image display information to the same device.

(F) In a data processing apparatus according to still another aspect of this invention comprising a portable arithmetic operation processing device and a head-mounted image display device for displaying image information from the arithmetic operation processing device, the arithmetic operation device has a housing section for housing the image display device while unused and the image display device comprises a liquid crystal display panel provided so as to correspond to at least one of the user's eyes, an enlarging optical means for forming enlarged virtual images on the liquid crystal display, and a holding means for holding the liquid crystal display and the enlarging optical means in front of the user's face and fixing the entire apparatus to the user's head.

According to still another aspect of this invention, in the above data processing apparatus, the arithmetic operation processing device has a charger having an electric contact in its housing section, and the image display device has an electric contact formed so as to connect to the electric contact in the housing section when the image display device is housed in the housing section and a battery charged when both contacts are connected together.

With the above constitution, due to its integral structure in which image information from the portable arithmetic operation processing device is displayed on the head-mounted image display device, which is housed in the arithmetic optation processing device, this invention enables confidential documents to be prepared, eliminates a locational limitation in which the apparatus cannot be used unless the display is fully opened, and improves the portability and operability of the data processing apparatus. In addition, since the battery for driving the head-mounted image display device can be charged immediately after housing, and the arithmetic operation processing device and the head-mounted image display device communicate with each other by radio, the arithmetic operation processing device and the head-mounted image display device are completely separated from each other, thereby allowing the data processing apparatus to be handled easily in its use and significantly simplifying the removal and mounting of the head-mounted image display device in the housing section.

BRIEF DESCRIPTION OF THE DRAWINGS

FIG. 38 is a model drawing showing the display method of this invention in which an image and its attributes are displayed in a first and second display areas that are located on the right and left of the screen, respectively;

FIG. 42 is a model drawing showing an embodiment of the display method of this invention wherein the head-mounted image display device according to this invention is used to simulate motion pictures and wherein an image and its attributes are displayed in a first and second display areas that are located on the right and left of the screen, respectively. FIG. 42(a) shows the results of a simulated image. FIG. 42(b) shows the trace of the airplane.

FIG. 42(c) shows the speed of the airplane. FIG. 42(d) shows the hierarchical segmentation of the image segments;

DETAILED DESCRIPTION OF THE PREFERRED EMBODIMENTS

Embodiment 1

Figure 1:
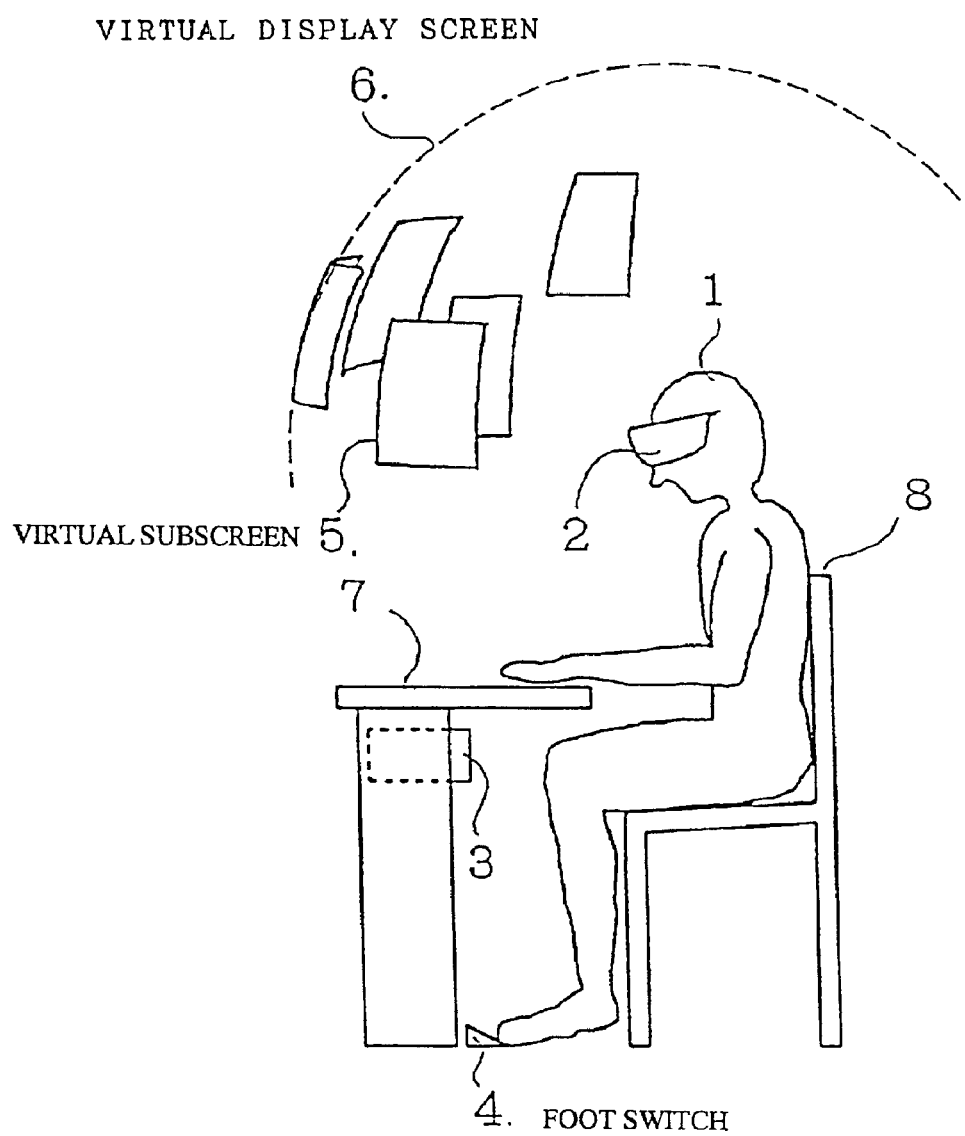
FIG. 1 shows a head-mounted image display device according to one embodiment of this invention.

FIG. 1 shows an embodiment in which an operator 1 is sitting on a chair 8 to perform operation on a desk 7. The operator 1 has a head-mounted image display device 2 (hereafter referred to as a "display device") mounted on his or her head. A computer 3 is disposed under the desk 7 to transmit image display information to the display device 2 via a connection cord (see FIG. 2). Furthermore, the computer 3 has connected thereto a foot switch 4 that acts as a trigger input means.

Figure 2:
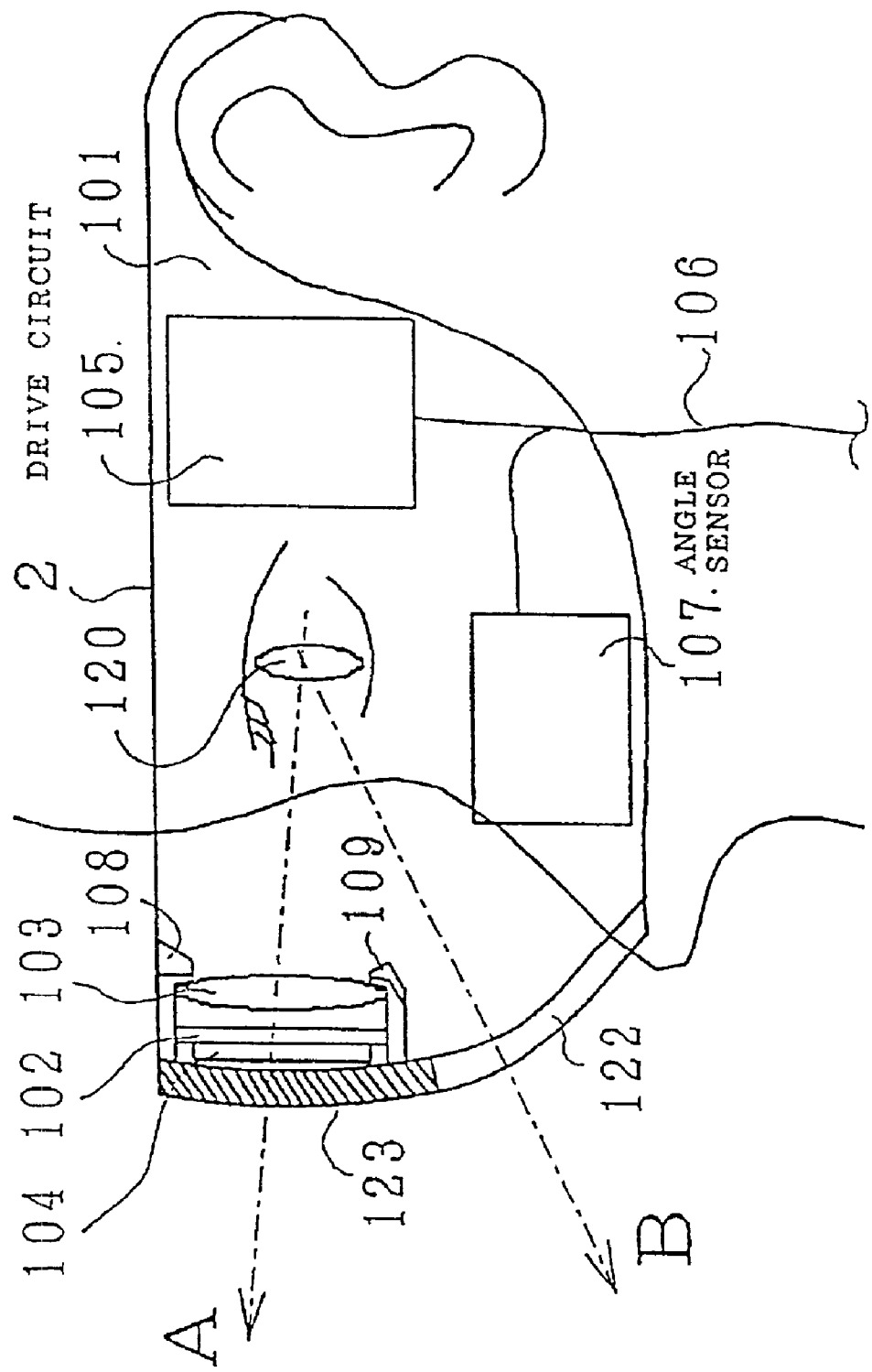
FIG. 2 is a block diagram showing the details of the display device in FIG. 1.

As shown in FIG. 2, the display device 2 has a spectacles-like frame 101 in which a drive circuit 105 is housed, and one end of the connection cord 106 is connected to the drive circuit 105. The drive circuit 105 and the computer 3 constitute an image generation means according to this invention. The frame 101 also has mounted in front thereof a liquid crystal panel 102 comprising a lateral pair of liquid crystal display devices and a back light 104 that illuminates the liquid crystal panel 102 rearways, and an enlarging lens 103 is disposed on the inner surface of the frame 101 between the liquid crystal panel 102 and the operator's eyes 120. Image display information sent from the computer 3 via the connection cord 106 is decoded by the drive circuit 105 and displayed on the liquid crystal panel 102.

The liquid crystal panel 102 is of a very small full color or monochrome type with a screen size of about 0.7 to 1.3 inch, and an image is enlarged by the enlarging lens 103 to about 14 inch at a visual range of 0.5 to 1.0 m and viewed by the operator 1 as a virtual image. The liquid crystal panel 102, the back light 104, and the enlarging lens 103 are each provided for each of the operator's eyes 120, and ordinarily arranged so as to display the same screen to allow the eyes to see a single display screen.

The display screen is located so as to be seen by the operator when he or she looks to a direction somewhat above the immediate front shown by arrow A in FIG. 2, and a lower part 122 has a high transmittance within the range of about 70 to about 95% so that when looking somewhat downward as shown by arrow B, the operator can look near his or her hands through the lower part 122 of the front surface of the frame 101. The upper part 123 of the front surface of the frame 101 has a lower transmittance within the range of 0 to about 10% so as to prevent extraneous light from entering the frame.

Furthermore, the frame 101 has mounted thereon an angle sensor 107 that detects the direction and angle of the operator's head 1 when it moves vertically or horizontally and that transmits detected data to the computer 3 via the connection cord 106. An infrared ray LED 108 is mounted over the enlarging lens 103, and a photosensor 109 is mounted under the lens 103 to detect the direction of the operator's line of sight and winking.

Referring FIG. 1 again, when looking somewhat upward, the operator 1 can view a display screen on the liquid crystal panel 102 as a virtual subscreen 5 on a virtual display screen 6 at a distance about 0.5 m to 1.0 m apart from the operator, and when looking somewhat downward, he or she can see an operation on the desk 7.

Figure 3:
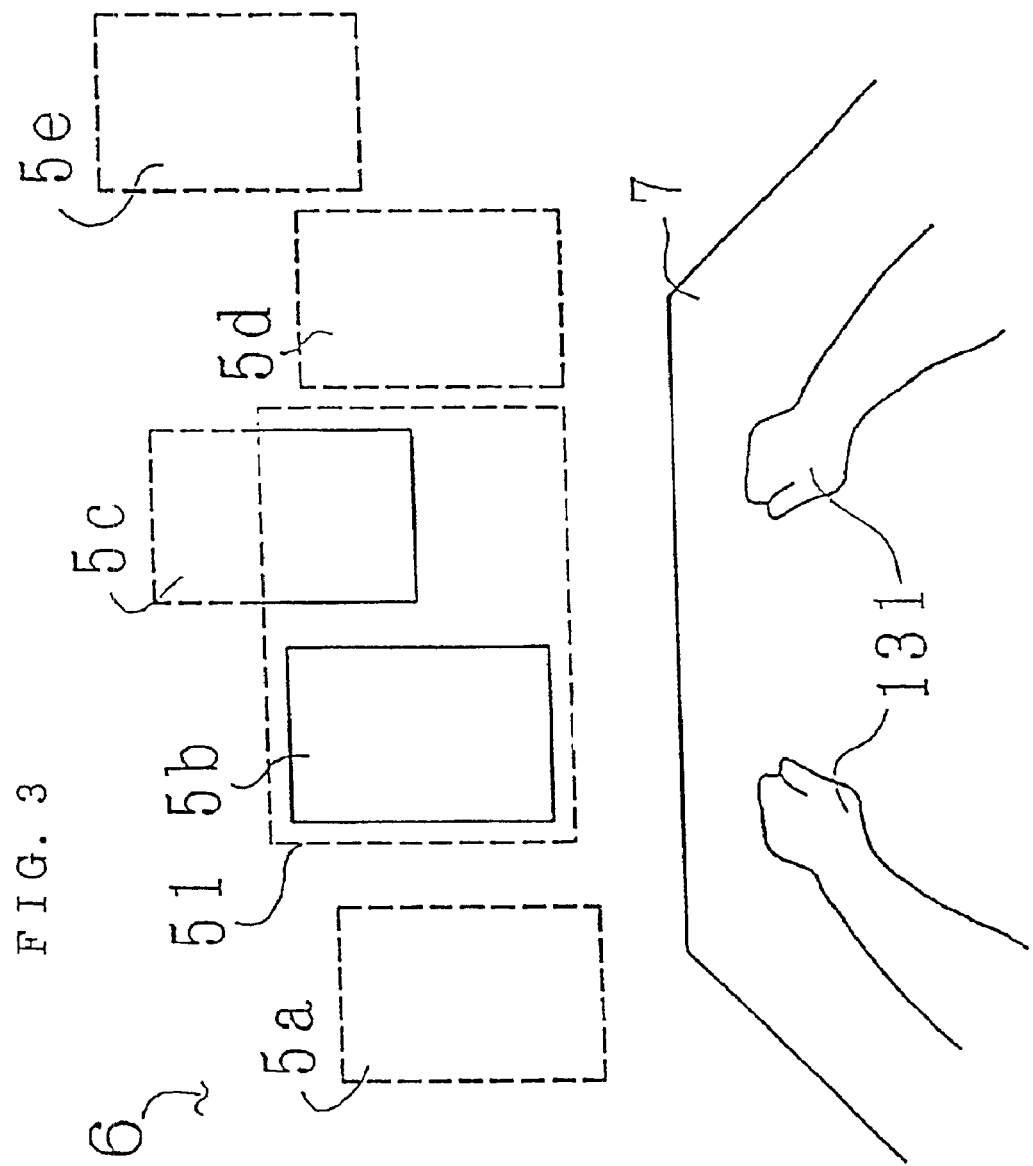
FIG. 3 shows a scene as seen by the operator in the embodiment in FIG. 1.

FIG. 3 shows a scene as seen by the operator 1. In this figure, both the entire virtual subscreen 5b and the lower part of a virtual subscreen 5c which are contained within the range shown by a display frame 51 corresponding to the maximum display range of the liquid crystal panel 102 are shown somewhat above the field of view. The desk 7 at which the operator 1 is performing an operation and the operator's hands 131 are shown somewhat below the field of view. When the operator 1 turns his or her head to the right, the display device 2 also moves to the right, and the display frame 51 accordingly moves to the right. The angle sensor 107 detects the direction and angle of the operator's head, and the virtual subscreen 5 from the computer 3 scrolls leftward according to the detected angle. The virtual subscreen within the display frame 51 changes to the subscreen 5c, then changes to the subscreen 5d, . . . , and so on. This is also true in the vertical direction. In this case, if the output of the angle sensor 107 and the distance over which the virtual subscreen 5 scrolls have been adjusted in advance, a fixed relative locational relationship can be maintained between the desk 7 and the virtual subscreen 5. By moving his or her head, the operator 1 can view part of a large number of virtual subscreens 5; it appears to the operator as if the subscreens were stuck to the virtual display screen 6 fixed to the space.

Figure 4:
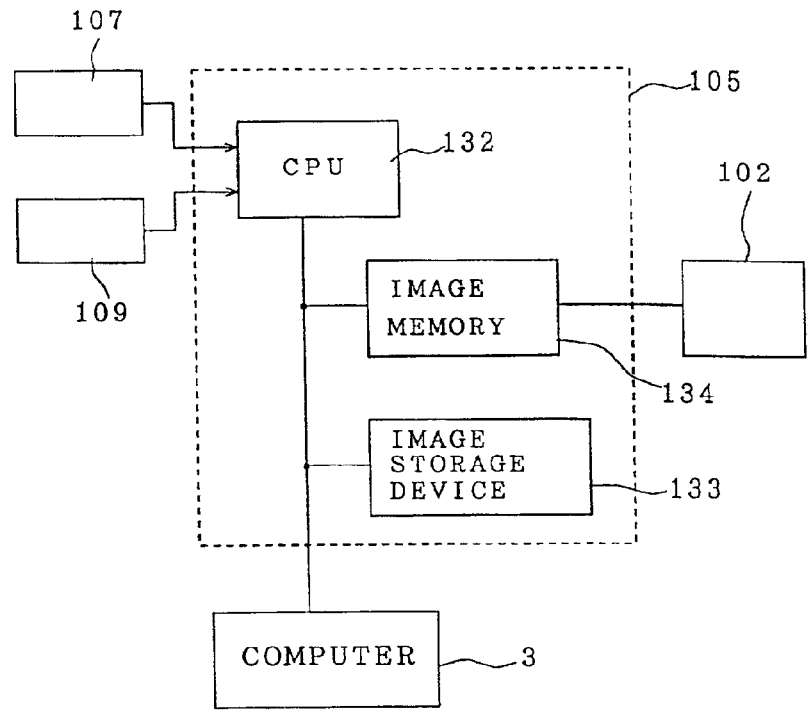
FIG. 4 is a block diagram showing the details of a control system in FIG. 2.

The drive circuit 105 in the display device 2 comprises a CPU 132, an image storage device 133, and an image memory 134, as shown in FIG. 4. The image storage device 133 has image data from the computer 3 stored therein, and the image memory 134 stores image data required to display a single screen (corresponding to the display frame 51) on the liquid crystal panel 102. The image storage device 133 (and the CPU 132 ) may be built into the computer 3.

Figure 5:
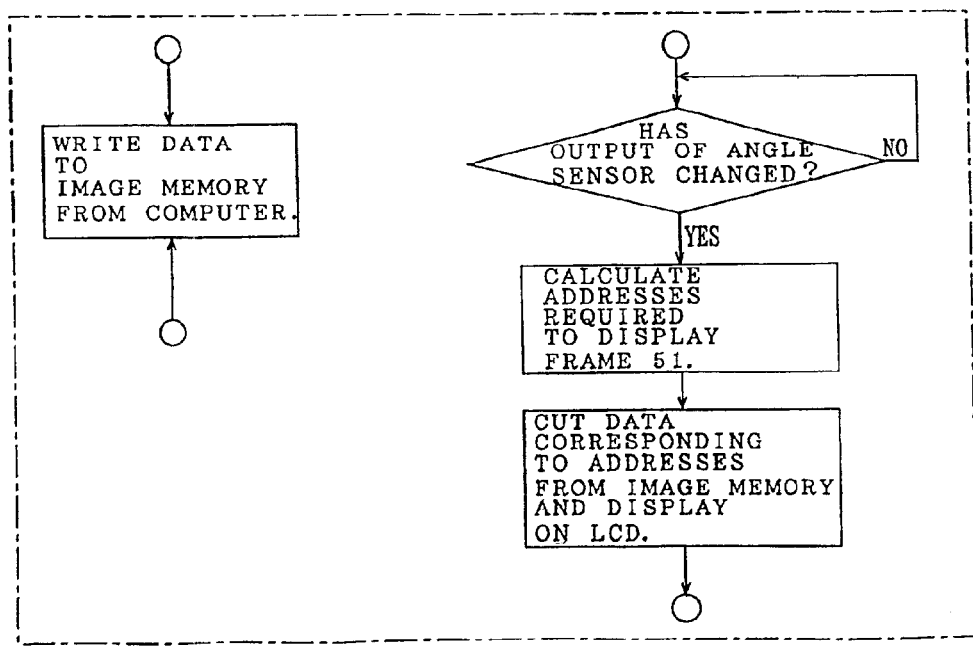
FIG. 5 is a flowchart showing the operation of the control system in FIG. 4.

The flowchart in FIG. 5 shows the operation of a control system in FIG. 4. The image storage device 133 regularly loads image data from the computer 3, and stores, for example, image data for the virtual subscreens 5a to 5e shown in FIG. 3. The CPU 132 checks whether or not the output of the angle sensor 107 has changed, and if it changes when the operator 1 moves his or her head, computes an address required to display a screen within the display frame 51 according to the change in angle to output it to the image storage device 133. The image storage device 133 cuts image data corresponding to the address to output it to the image memory 134. The liquid crystal panel 102 displays the image data. In this manner, the operator 1 can view a large number of virtual subscreens 5 simply by moving his or her head.

Next, a method for moving any one of the large number of virtual subscreens 5 on the virtual display screen 6 is described.

Figure 6:
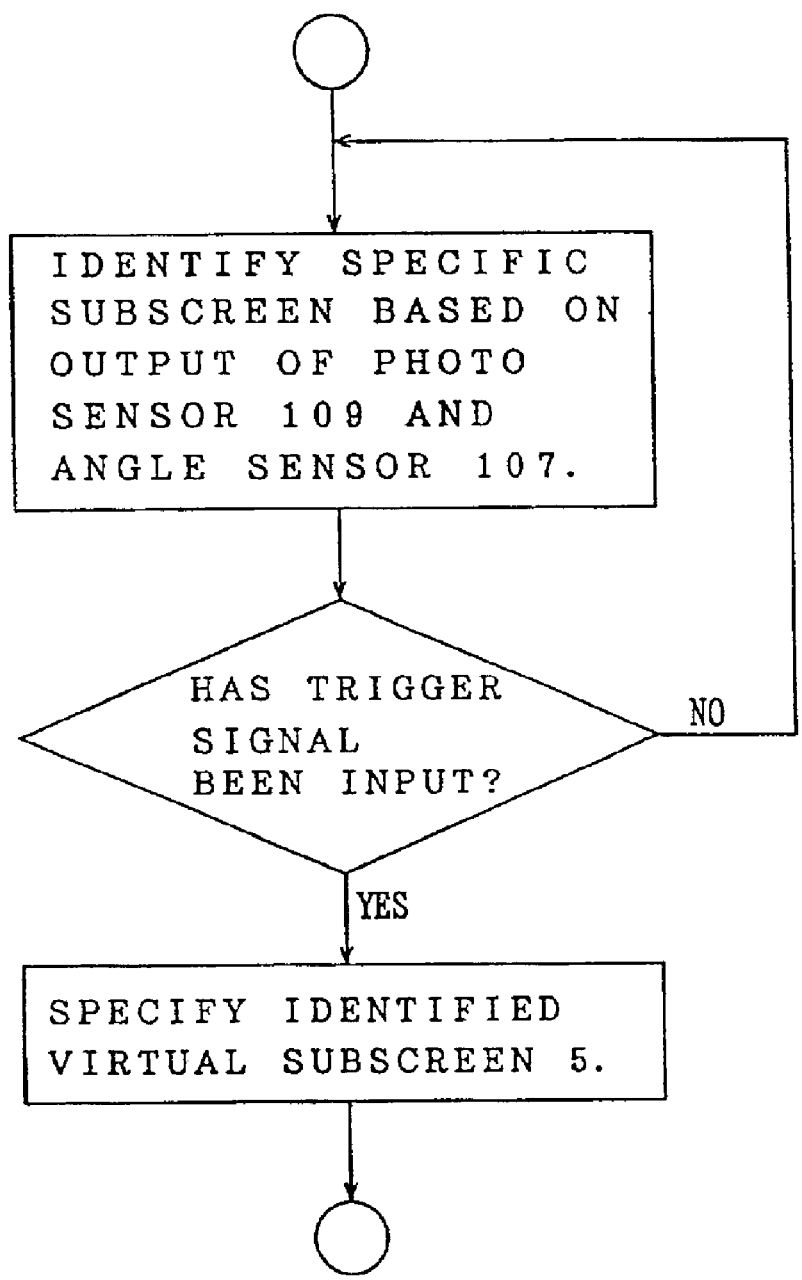
FIG. 6 is a flowchart showing a method for specifying images in the embodiment in FIG. 1.

First, a method for specifying any one of the large number of virtual subscreens 5 is described on the basis of the flowchart in FIG. 6.

The position of the display frame 51 is determined by the output of the angle sensor 107 as described above. That is, this output determines the address in the image memory 134 which corresponds to the virtual display screen 6. In addition, the photosensor 109 can detect what portion within the display frame 51 the operator is viewing. Thus, the photosensor enables the identification of the portion on the virtual display screen 6 which the operator is viewing, that is, the portion that corresponds to a particular address in the image memory 134. When the operator stamps on the foot switch 4 that acts as a trigger input means, the identified address is confirmed to specify the virtual subscreen 5 including the address, resulting the movement of the subscreen (this is like the movement of a window on the Windows screen using a mouse. The movement of the operator's line of sight corresponds to the movement of the mouse whereas the foot switch corresponds to the click button of the mouse). Thus, when stamping on the foot switch 4 while viewing an arbitrary virtual subscreen 5 to be moved, the operator can specify the portion within the virtual subscreen 5 which the operator 1 is viewing.

Figure 7:
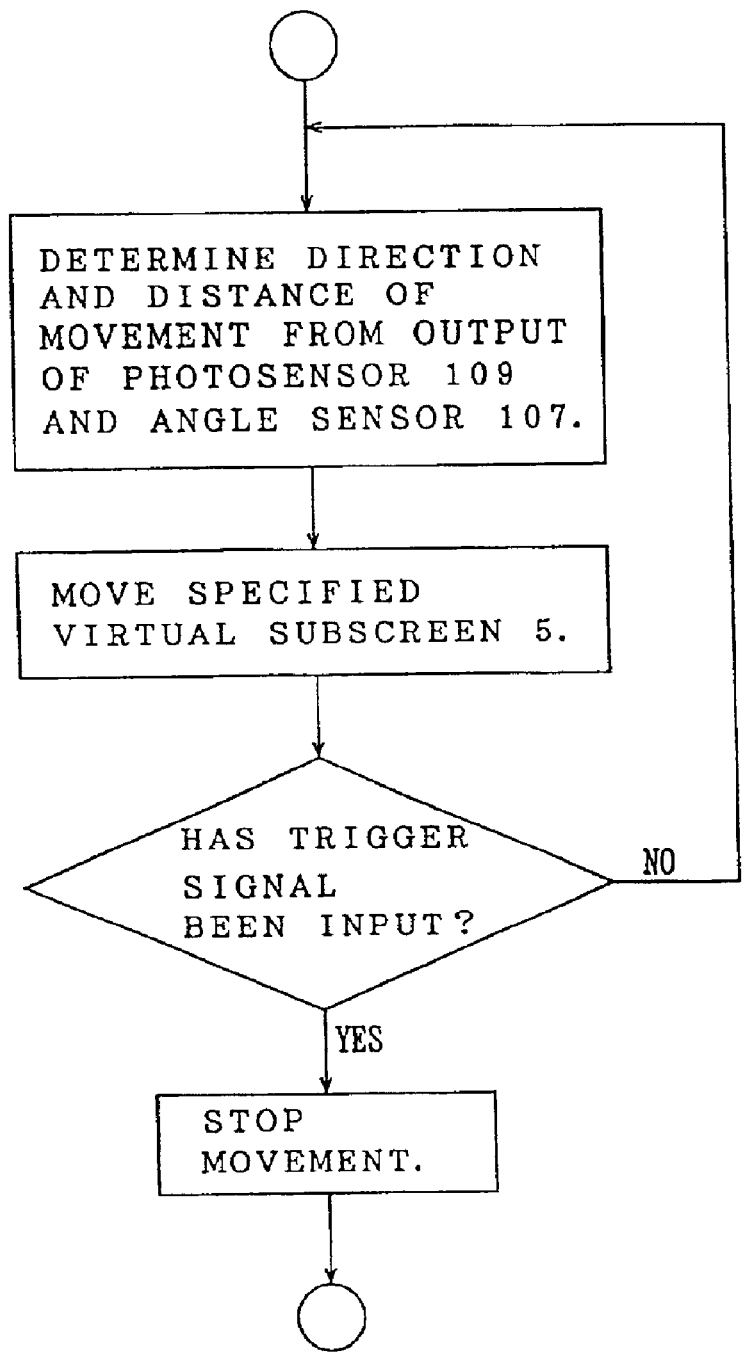
FIG. 7 is a flowchart showing a method for moving images in the embodiment in FIG. 1.

Next, a method for moving the specified virtual subscreen 5 is described on the basis of the flowchart in FIG. 7.

The virtual subscreen 5 specified in the above manner moves on the basis of the moving direction and distance determined from the most recent output of the photosensor 109 and the angle sensor 107. That is, the direction of the operator's line of sight is determined from the output of the photosensor 109 to determine where to move the virtual subscreen 5 within the display frame 51, and the direction of the operator's head is detected from the output of the angle sensor 107 to determine where to move the virtual subscreen 5 on the virtual screen 6. The virtual subscreen 5 is thus moved, and the destination is updated until a trigger signal is input. When the operator stamps on the foot switch 4, the specified virtual subscreen 5 stops moving and is then fixed to the operator's observation point. In this manner, an arbitrary virtual subscreen 5 can be moved freely to a desired position on the virtual screen 6.

It is then assumed that the operator 1 is experimenting on an electronic circuit on the desk 7.

Specifications and other materials for parts to be used in the experiment are registered in the computer 3 in advance to display them as a plurality of virtual subscreens 5 on the virtual screen 6. The operator 1 can view any material by displaying a desired virtual subscreen 5 within the display frame 51. Furthermore, stamping on the foot switch 4 while viewing a desired virtual subscreen 5 causes that virtual subscreen 5 to be specified, moving the operator's head enables it to be moved to a position in which it can be seen most clearly, and stamping on the foot switch 4 again enables it to be fixed on the virtual screen 6.

If the display is complicated due to a large number of virtual subscreens 5 on the virtual screen 6, after specifying the virtual subscreen 5 as described in FIG. 6, the combination of the number of times of stamps on the foot switch 4 and the interval between the stamps can be adjusted so as to send to the computer 3 an instruction for iconizing specified virtual subscreens 5 to reduce their sizes, thereby obtaining a clear display.

If displayed virtual subscreens 5 are too small to see them clearly, the combination of the number of times of stamps on the foot switch 4 and the interval between the stamps can be adjusted so as to send to the computer 3 an instruction for enlarging specified virtual subscreens 5.

As described above, this embodiment enables a large number of materials to be referenced without putting the surroundings in disorder, thereby avoiding the decrease in working efficiency. In addition, since operation can be achieved simply by moving the operator's head, eyes, and foot, and his or her hands are not occupied in the operation, accidents such as falling of a part being experimented on or damage thereto can be avoided even during a complicated experiment. Furthermore, since required materials can be placed in positions in which they can be seen most clearly, the movement of eyes between a part being experimented on and the relevant material can be minimized to reduce the operator's fatigue.

Even if a large number of virtual subscreens are displayed, they can be distributed over the virtual screen and are enabled to scroll by movement of the operator's head, thereby preventing them from overlapping each other on the screen.

Furthermore, by connecting instrument used for the experiment to the computer 3 in advance, the results of measurement can be displayed close to the operator as a virtual subscreen 5 to enable the experiment to be conducted more efficiently.

Embodiment 2

Figure 8:
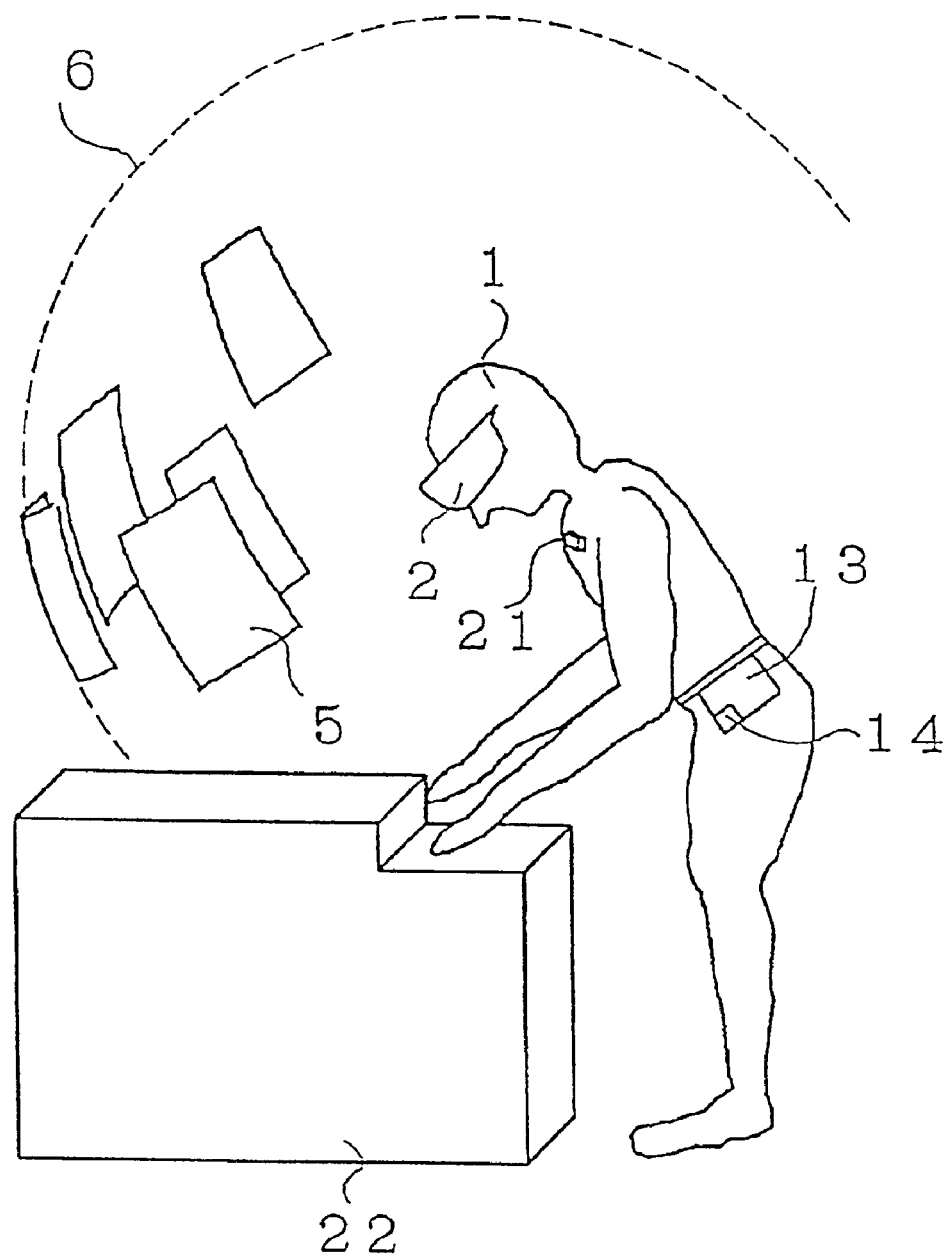
FIG. 8 shows a head-mounted image display device according to another embodiment of this invention.

FIG. 8 shows an embodiment in which the operator 1 is repairing an apparatus 22. The display device 2 is mounted on the operator's head, and an angle sensor 21 is mounted on the operator's chest, and a portable computer 13 and a push switch that acts as a trigger input means are mounted on the operator's waist. The display device 2 is the same as in Embodiment 1, and its description is thus omitted. The display device 2 is connected to the computer 13 through a connection cord.

In looking somewhat upward, the operator 1 can view the display screen of a liquid crystal panel 102 as a virtual subscreen 5 on a virtual display screen 6, while in looking somewhat downward, the operator can view the apparatus 22 being repaired.

Figure 9:
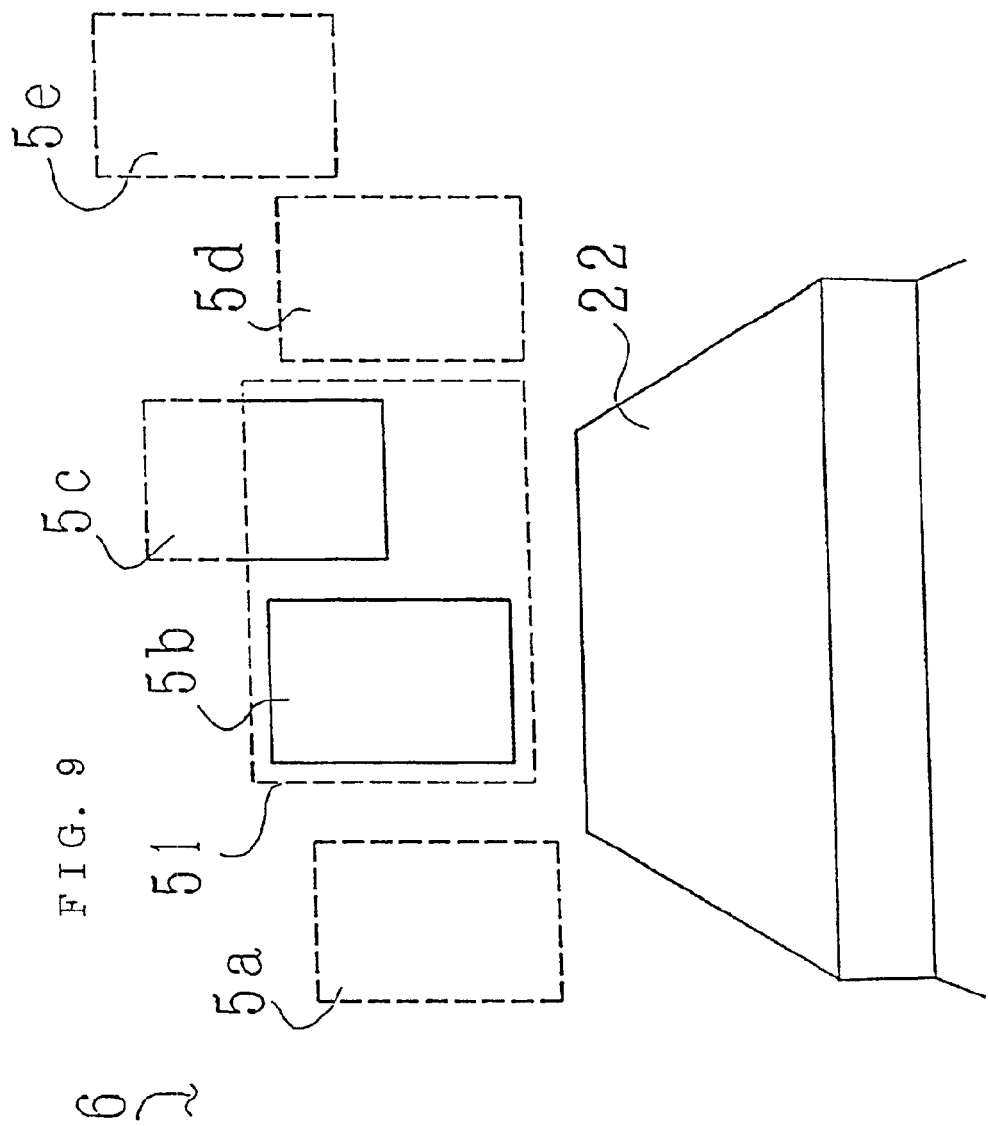
FIG. 9 shows a scene as seen by the operator in the embodiment in FIG. 8.

FIG. 9 shows a scene as seen by the operator 1. In this figure, both the entire virtual subscreen 5b and the lower part of a virtual subscreen 5c which are contained within the range shown by a display frame 51 corresponding to the maximum display range of the liquid crystal panel 102 are shown somewhat above the field of view. The apparatus being repaired is shown somewhat below the field of view. When the operator 1 turns his or her head to the right, the display device 2 moves to the right, and the display frame 51 accordingly moves to the right. The virtual subscreen 5 from the computer 13 then scrolls leftward according to the angle detected by an angle sensor 107 provided in the display device 2. The virtual subscreen within the display frame 51 changes to the subscreen 5c, then changes to the subscreen 5d, . . . , and so on. This is also true in the vertical direction. In this case, if the output of the angle sensor 107 and the distance over which the virtual subscreen 5 scrolls have been adjusted in advance, a fixed relative locational relationship can be maintained between the surrounding space and the virtual subscreen 5. It appears to the operator as if the large number of subscreens 5 were stuck to the virtual display screen 6 fixed to the space.

If the operator 1 stoops or moves to repair another part of the apparatus 22, the angle sensor 21 mounted on the operator's chest detects the operator's movement to inform the computer 13 of it. The computer 13 arithmetically processes the output of the angle sensor 21 and the output of the angle sensor 107 provided in the display device 2, and if it determines that the output of the angle sensor 21 is equivalent to the output of the angle sensor 107, treats this as the movement of the entire body and allows the display on the virtual screen 6 to remain unchanged. That is, the relative locational relationship between the operator 1 and the virtual screen 6 is maintained constant, and the virtual screen 6 follows the movement of the operator's body. In this manner, the virtual screen 6 is always displayed around the operator 1, and the virtual subscreen 5 can be viewed as required simply by looking somewhat upward, whatever posture the operator is assuming.

Furthermore, pressing the push switch 14 while viewing a virtual subscreen 5, as described in Embodiment 1, enables that subscreen 5 to be specified on the basis of the direction of the operator's line of sight detected by a photosensor 109 and the output of the angle sensor 107. Then, by moving the specified virtual subscreen 5 based on the output of both the photosensor 109 and the angle sensor 107 and subsequently pressing the push switch 14 again, the specified virtual subscreen 5 can be fixed to the current observation point. In this manner, an arbitrary virtual subscreen 5 can be moved to a desired position on the virtual screen 6.

Next, it is assumed that the operator 1 is actually repairing the apparatus 22. Instruction manuals and specifications required for repairs are registered in the computer 13 in advance. A plurality of virtual subscreens 5 are displayed on the virtual screen 6, that is, stored in an image storage device 133. A desired instruction manual can be viewed by moving the operator's head to display the corresponding virtual subscreen 5 within the display frame 51. Furthermore, by pressing the push switch 14 while viewing a desired virtual subscreen 5, moving the operator's head and line of sight to a position in which the subscreen can be seen clearly, and then pressing the push switch 14 again, the virtual subscreen can be fixed to the virtual screen 6. In addition, even if the operator moves to repair another part of the same apparatus, the virtual screen 6 remains in the same position around the operator 1, so required instruction manuals can be referenced whatever working posture the operator is assuming.

As an alternative to the trigger means described in Embodiments 1 and 2, the output of photosensor 109 is obtained, for example, when the operator gives two consecutive quick winks. This enables both hands to be used for repairs even in Embodiment 2. It is clear that voices or breathing can also be used as a trigger means.

Embodiment 3

Figure 10:
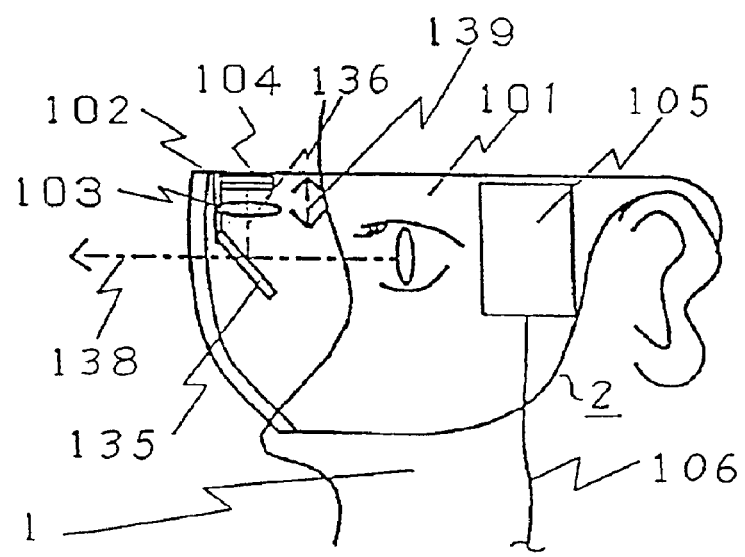
FIG. 10 shows a head-mounted image display device according to yet another embodiment of this invention.
Figure 11:
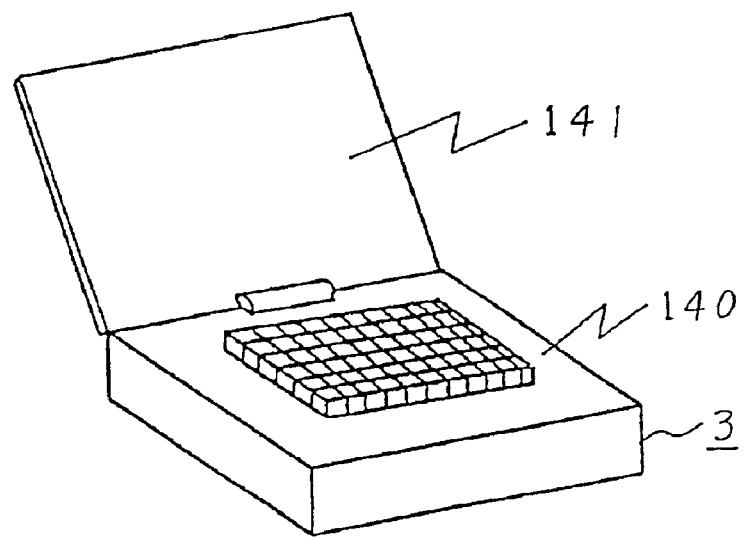
FIG. 11 describes a screen applied to the embodiment in FIG. 10.

The display device 2 in the embodiment shown in FIG. 10 has a spectacles-like frame 101 including the liquid crystal panel 102, the enlarging lens 103, the back light 104, and a half mirror 135. The operator 1 can view an enlarged display image on the liquid crystal panel 102 and an external image (the keyboard) through optical paths 136 and 138, respectively. These images can be synthesized by the half mirror 135 and viewed by the operator 1. The operator 1 thus feels as if the liquid crystal display image were present outside the frame (near the keyboard), resulting in improved workability.

With this configuration, however, a few problems may occur. First, the liquid crystal display image and the external image simply overlap each other, so the display image cannot be distinguished clearly. Second, since the distance between the operator and the virtual image cannot be matched easily with the distance between the operator and the keyboard, focusing for eyes must be carried out each time the field of view is switched between the liquid crystal display image and the keyboard contained in the synthesized image, resulting in a marked fatigue of the operator.

These problems can be solved by employing part of an outer sheath case for the data processing apparatus and the keyboard as a screen. That is, the rear face 141 of a cover for the keyboard 140 of the computer 3 is used as a screen. This screen consists of an opaque material with a single color such as white, black, or blue, and is effective in improving the visibility of a liquid crystal display image that is allowed to overlap the screen image. The color and reflectivity of the screen are depends on the degree of this effect.

Figure 12:
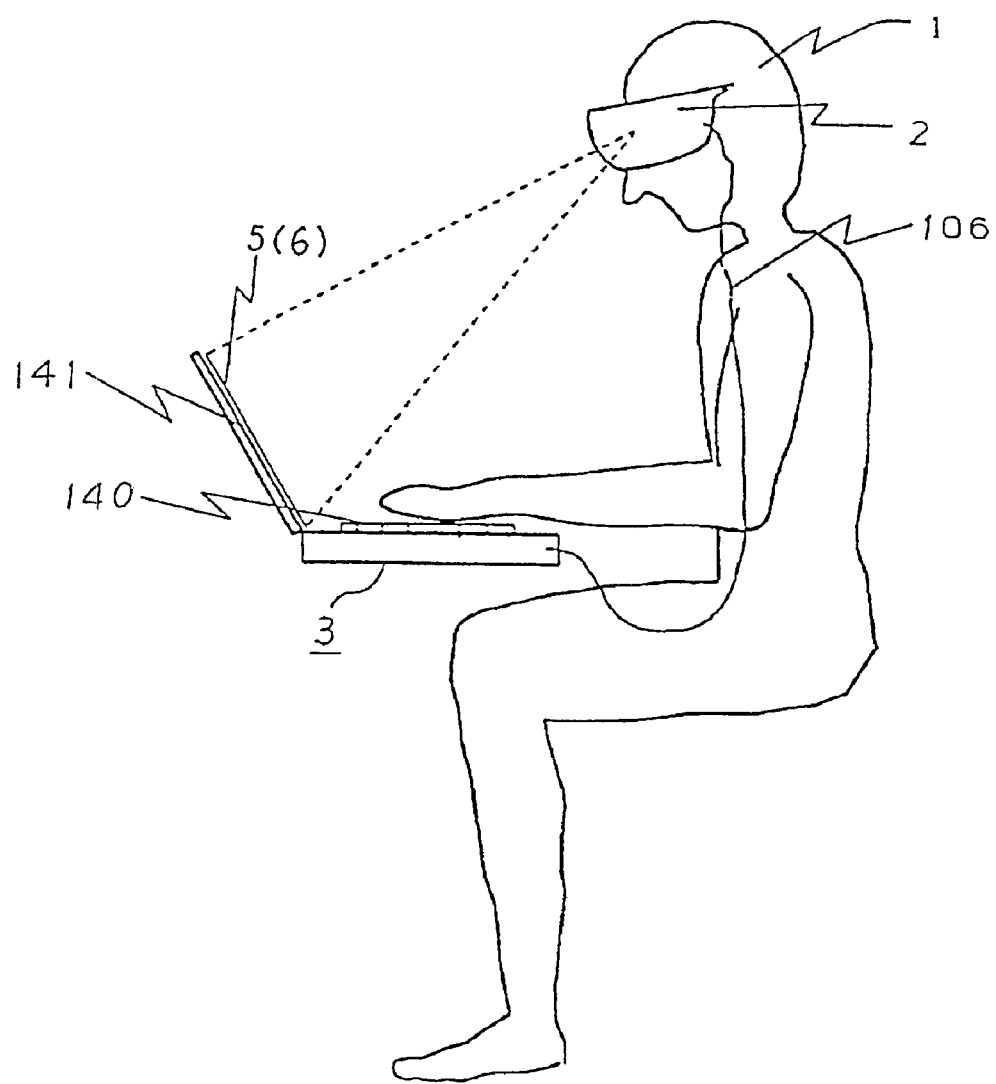
FIG. 12 explains a usage of the embodiment in FIG. 10.

As in the example shown in FIG. 12, the operator 1 can longitudinally move relative to the operator 1, the position in which the virtual subscreen 5 for a liquid crystal display image is formed by moving the liquid crystal panel 102 in the direction 139 (along the optical path 136 ) in FIG. 10. Then, matching this position with the screen 141 enables the above problems to be solved.

Since the external image that overlaps the liquid crystal display image is the monochrome screen, it does not substantially disturb the visibility of the display image. That is, the display image has a high visibility, leading to improved workability. In addition, the virtual subscreen 5 for a liquid crystal display image is formed on the screen 141 close to the keyboard 140, so focusing for eyes need not be executed when the field of view is switched between the display image (the virtual subscreen 5) and the keyboard 140, resulting in a reduced fatigue of the operator.

Consequently, the above embodiment enables the implementation of portable computers and word processors that have high portability and visibility and that do not affect the operator's health.

The characteristics of the screen is not limited as long as they meet the objectives of this invention. For example, attaching a polarizing plate to the screen can reduce the brightness of the external image with the brightness of the liquid crystal display image maintained, thereby enabling high contrast display to be realized.

Embodiment 4

Figure 13:
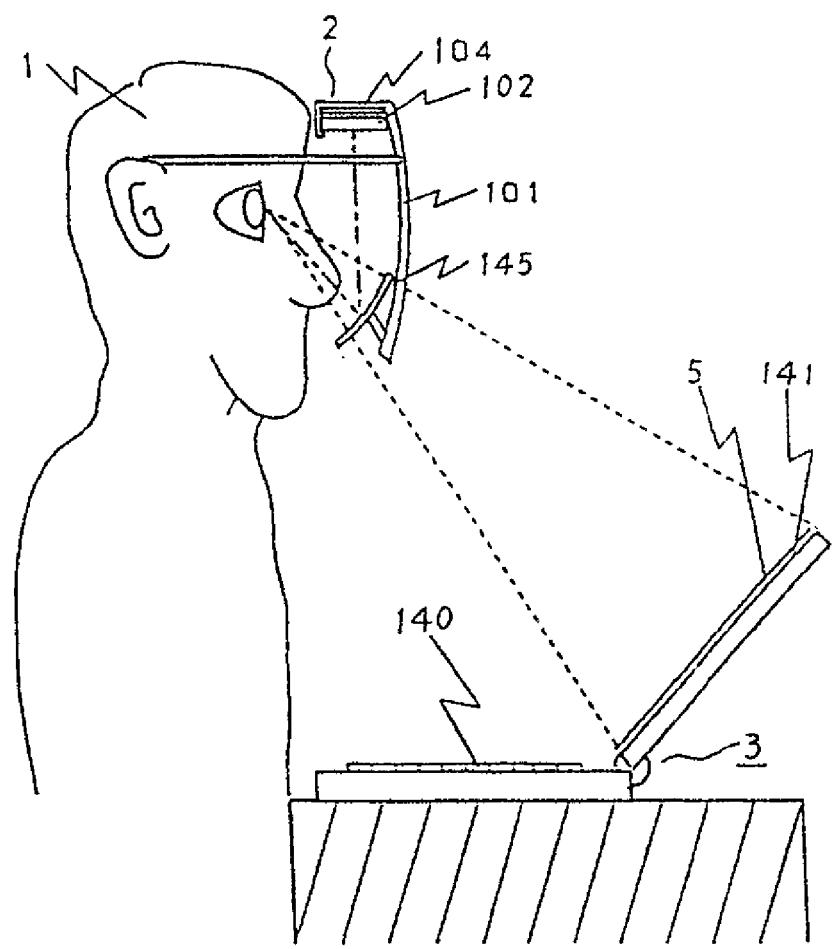
FIG. 13 describes a usage of a head-mounted image display device according to still another embodiment of this invention as seen laterally.
Figure 14:
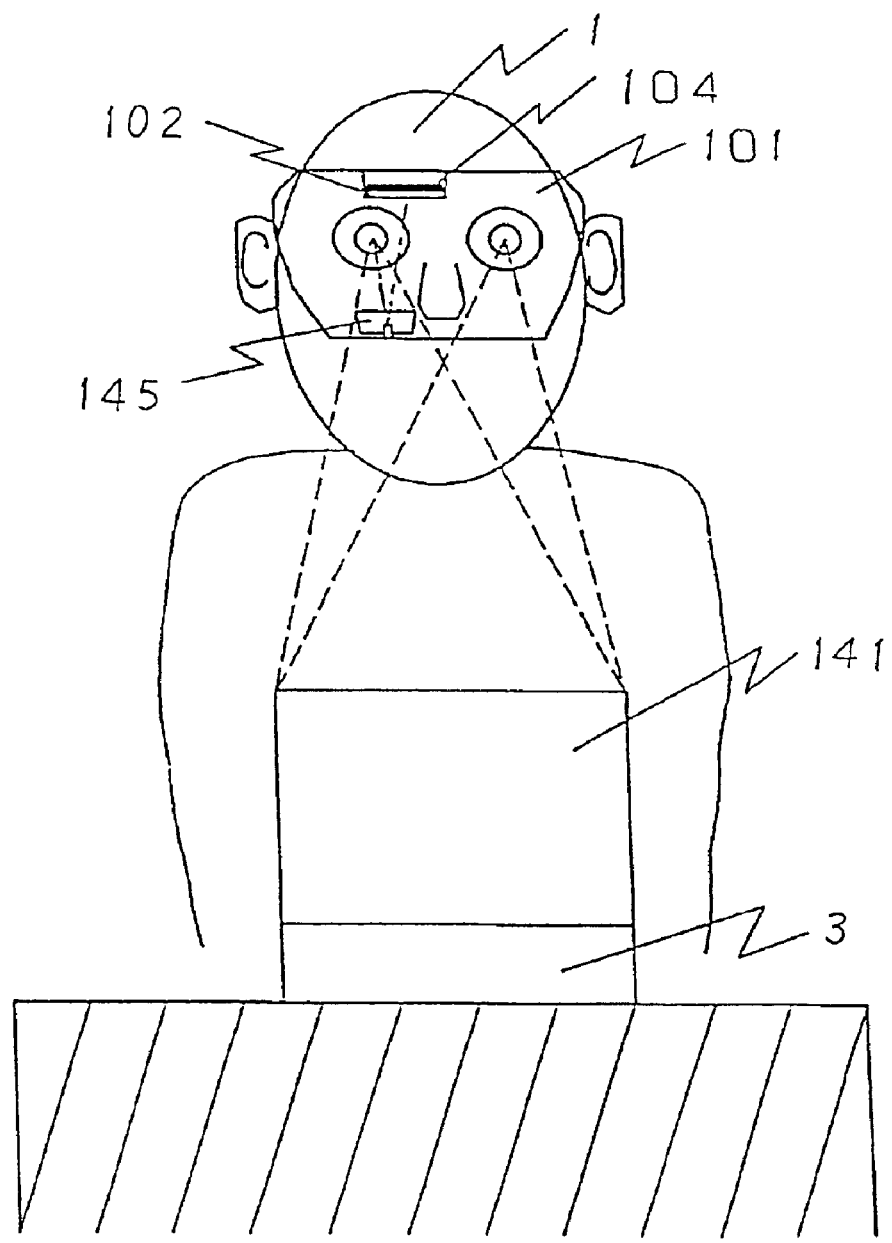
FIG. 14 explains the usage of the embodiment in FIG. 13 as seen frontways.

The display device in FIGS. 13 and 14 is of a single eye type. In these figures, the cable for connecting the drive circuit to the main body is omitted for simplification.

An image displayed on the liquid crystal panel 102 is enlarged by the enlarging mirror 145, and the operator's right eye sees a large display image in front of the operator, while his or her left eye sees the exterior through the transparent spectacles-like frame 101. The problem in single eye-type display devices (the visibility of the display image is bad because the external image overlaps the display image, and the difference between focusing for the right and left eyes causes a significant fatigue of the operator) can be solved by adjusting the distance between the liquid crystal panel 102 and the enlarging mirror 145 so as to form on the screen a virtual subscreen 5 that is a display image so that the operator's left eye can see the screen 141. That is, since the virtual screen on the liquid crystal display screen is formed on the monochrome and uniform screen 141, the visibility of the liquid crystal display screen is improved, and an equal focusing for the right and left eyes serves to reduce the operator's fatigue to almost the same level as in ordinary displays.

Consequently, the above embodiment can provide portable computers and word processors that have a good portability and visibility and that do not affect the operator's health.

Embodiment 5

Figure 15:
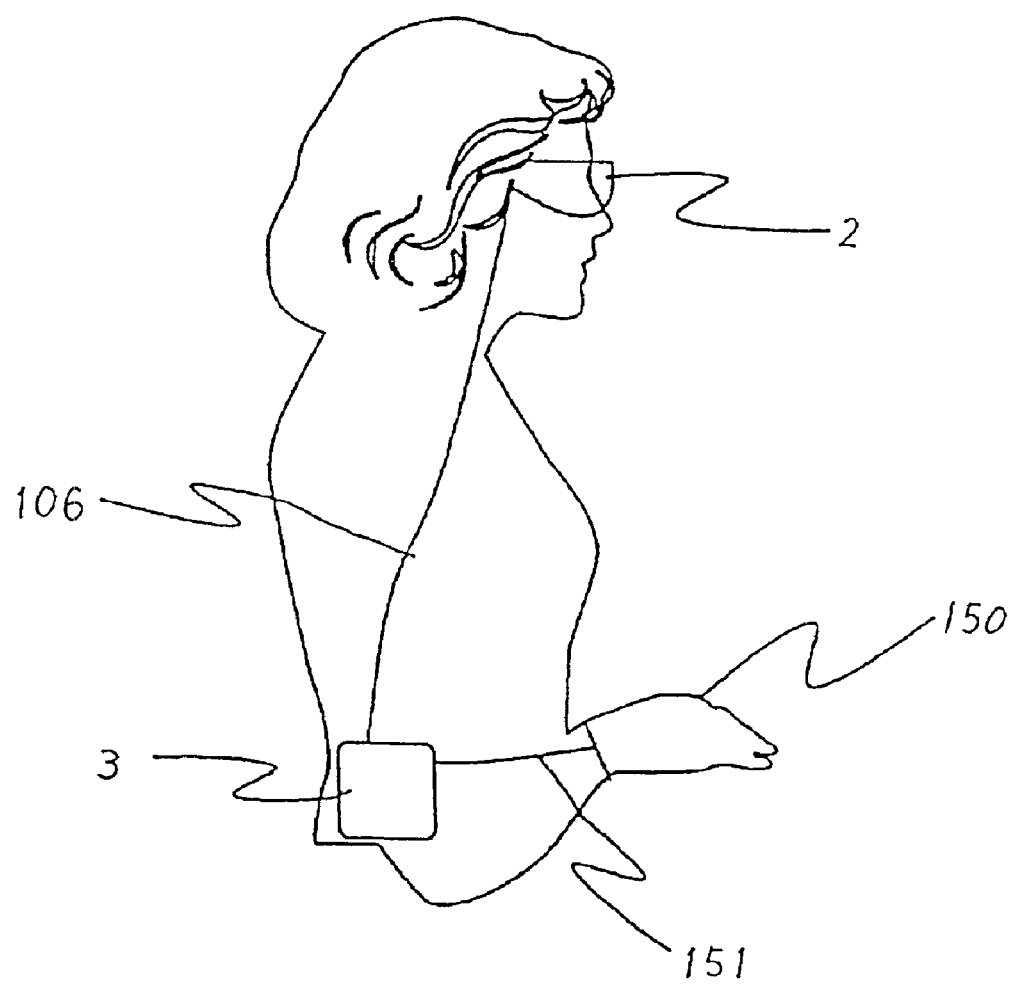
FIG. 15 describes the operator inputting data with a head-mounted image display device according to still another embodiment of this invention (which displays input information and the results of arithmetic operations) mounted on the operator's head.

In the embodiment in FIG. 15, a signal from the input device 150 is input to the computer (an arithmetic unit) 3 via the connection cord 151, and image display information output from the computer 3 is transmitted to the head-mounted display device 2 via the connection cord 106. The head-mounted display device 2 enables the simultaneous display of that input information such as the conditions of the input device 150 such as a keyboard or a data glove which is output by the computer 3 and the results of arithmetic operations from the computer 3, and indicates what keys can be currently used for input and what key the operator is touching.

The display screen of the head-mounted display device 2 is long, and is composed of an arithmetic operation result display screen 152 for displaying the results of arithmetic operations within the virtual subscreen 5 and a virtual keyboard display screen 153 for displaying the conditions of the input device. By using as the input device 150, for example, a data glove having a means for measuring the transmittance of light through optical fibers to detect the bending of the operator's fingers and using a magnetic sensor to detect the relative position of the operator's hands, or a keyboard with a sensor having a position detection means such as a resistant film-like tablet, the input position can be detected, and the results of arithmetic operations can be viewed while a key assignment means 156 and an image synthesizing means 159 in the computer 3 are used to check on the virtual keyboard display screen 7 what key is being pressed.

Next, a method for outputting the results of arithmetic operations on the arithmetic operation result display screen 152 and displaying the conditions of the input device 150 on the virtual keyboard display screen 153 is described with reference to the block diagram in FIG. 17. The input device 150 detects positional information 154 for the positions of the operator's hands and fingers and on/off information 155 indicating whether or not any finger tip is pressing a key to transmit this information to the computer 3. The computer 3 uses the key assignment means 156 to assign keys over the input range of the input device 150 for each application in advance in order to determine what keys correspond to input positional information 154, and determines from the on/off information 155 whether or not the key is activated in order to transmit the results to an arithmetic operation section 158 and an image synthesizing means 159 as input information 157. The arithmetic operation section 158 performs arithmetic operations based on the input information 157 to transmit the results 160 to the image synthesizing means 159. The image synthesizing means 159 continuously outputs the conditions of the input device 150 such that which key the operator's hand is touching based on the input information and the on/off state of the key, and outputs to the head-mounted display device 2 a signal as an image signal 161 which synthesizes the results of arithmetic operation 160 from the arithmetic operation section 158 into one image each time such an operation is carried out. The input device 150 simply transmits the positional information 154 and the corresponding on/off information 155 to the computer 3, thereby enabling the key assignment means 156 to assign various keys without depending on the number of keys on the input device 150 and also allowing the virtual keyboard display section 153 to display various interfaces.

Figure 17:
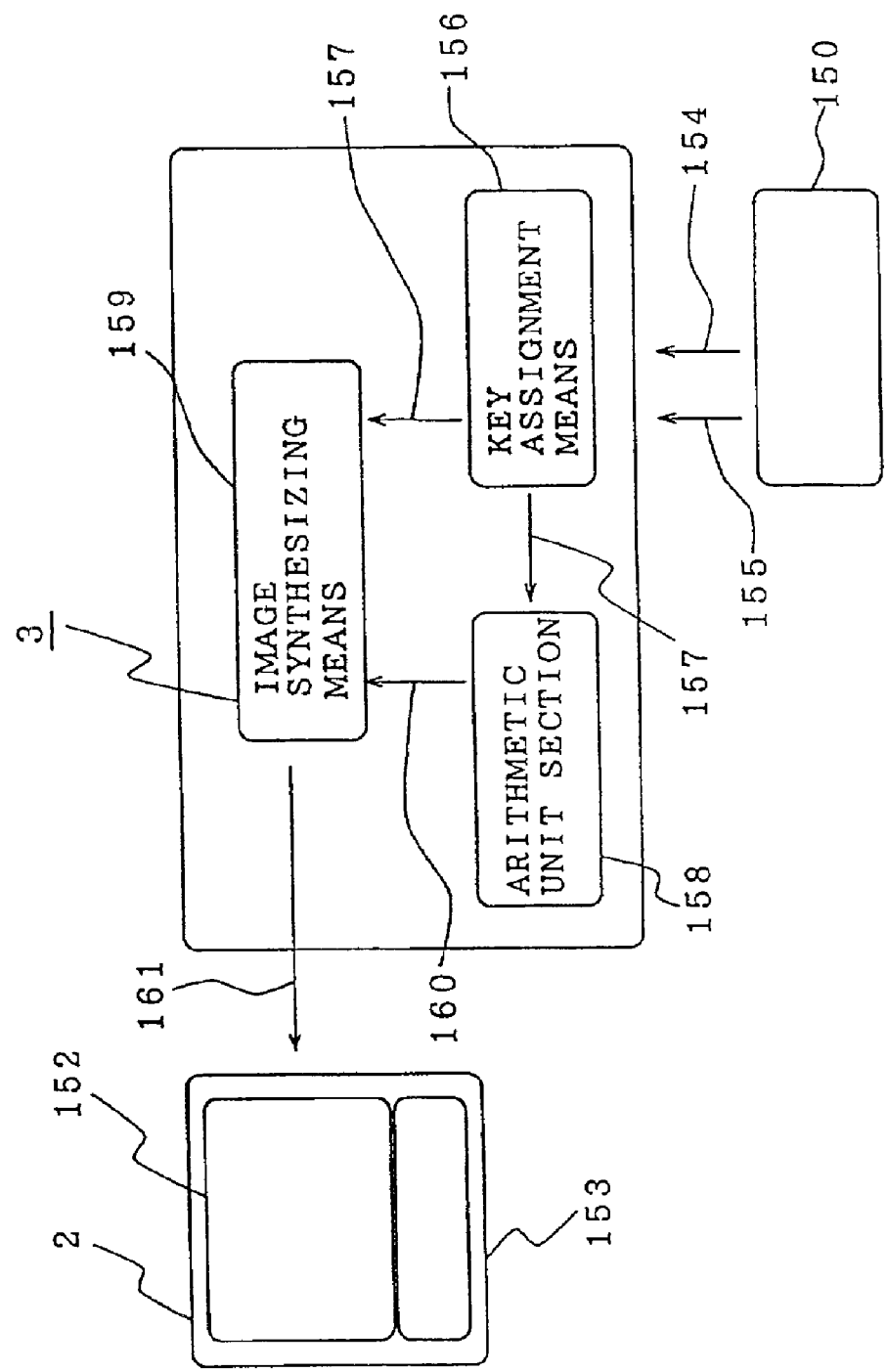
FIG. 17 is a block diagram showing the constitution of an arithmetic operation device in the embodiment in FIG. 15.
Figure 18:
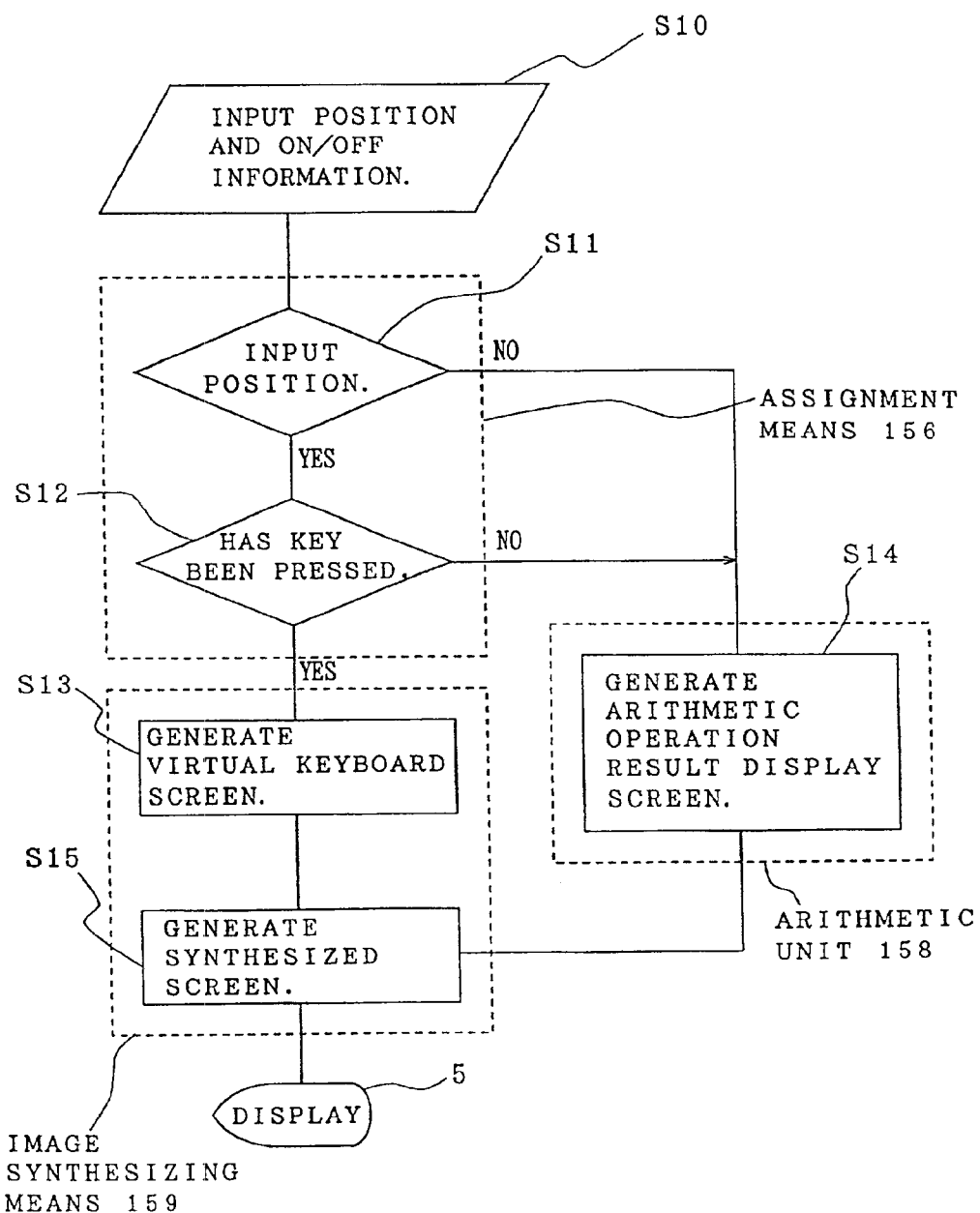
FIG. 18 is a flowchart showing the flow of signals in the embodiment in FIG. 15.
Figure 19:
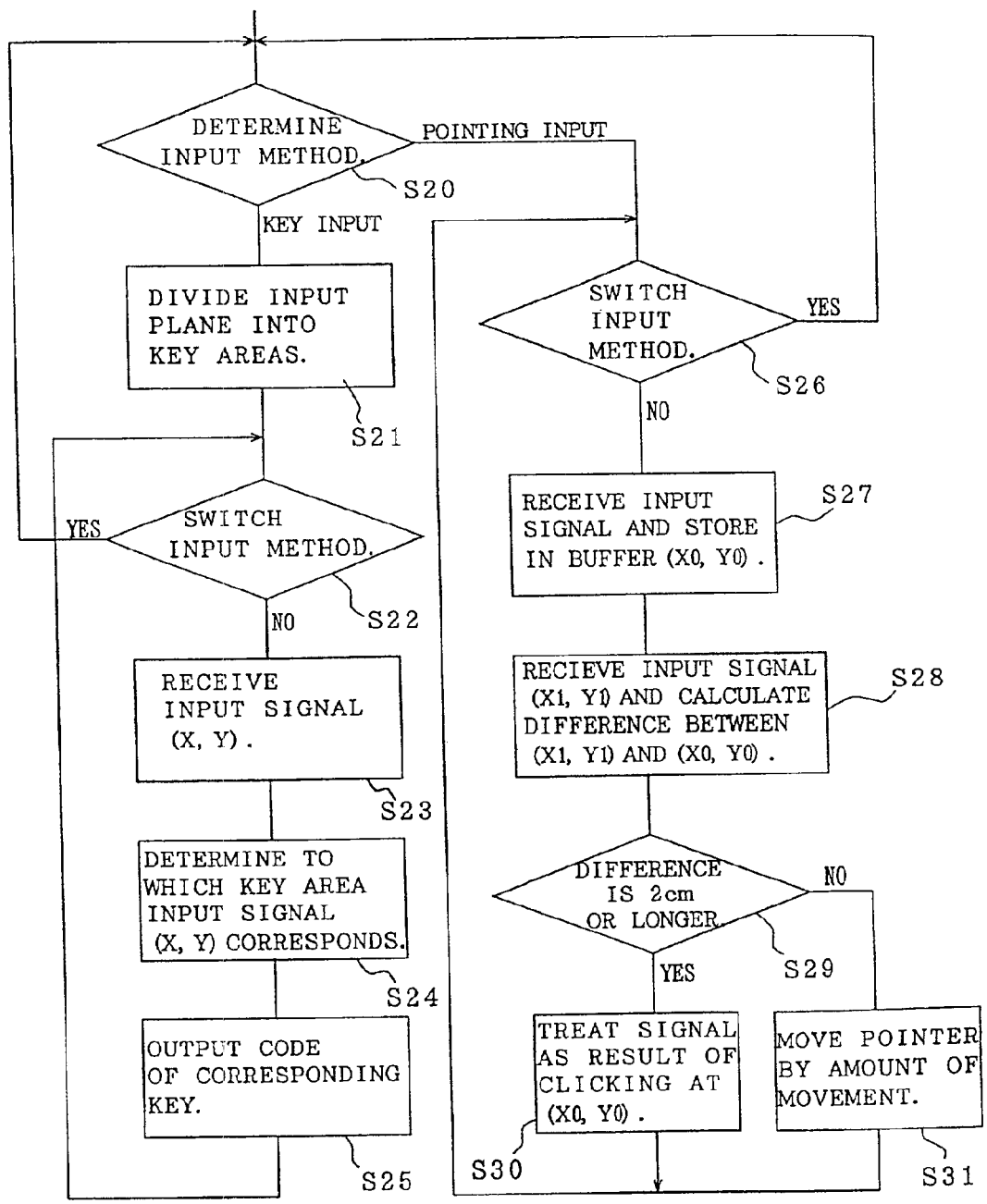
FIG. 19 is a flowchart showing a process executed in an assignment means in FIG. 17.

The flow of signals in the control system in FIG. 17 is described with reference to FIG. 18. The input device 150 detects the input position and the corresponding on/off information (S10). The key assignment means 156 determines to what key the input position corresponds, and transmits the contents of the corresponding key to the arithmetic operation section 158 (S11). The key assignment means 156 then determines whether or not the key is being pressed, and if so, informs the arithmetic operation section 158 of this state (S12). The image synthesizing means 159 then generates an image on the virtual keyboard display screen 153 based on the input position and the on/off information (S13). The arithmetic operation section 158 performs arithmetic operations based on transmitted information to generate an arithmetic operation result display screen 152 (S14). The image synthesizing means 159 synthesizes as a single screen the virtual keyboard display screen 153 and the arithmetic operation result display screen 152 generated by the arithmetic operation section 11 to generate a virtual subscreen (S15).

The input device 150 includes resistant film-type devices, a collection of small switching elements, and various other devices. Next, the process executed by the assignment means 156 when a resistant film-type input device is used for key and pointing input is described in detail.

The assignment means 156 first determines the input method of the input device 150 (S20). If the input device 150 uses a key input method, the assignment means 156 divides the input plane into key areas (S21). The assignment means subsequently determines whether or not the input method has been switched (S22), and if not, receives the input signal $(X, Y)$ (S23). It then examines to which key area the input signal $(X, Y)$ corresponds (S24), and outputs the code for the corresponding key (S25).

If the assignment means determines in S20 that the input device uses a pointing method, it then determines whether or not the input method has been switched (S26). If not, it receives the input signal and stores it in a buffer $(X_0, Y_0)$ (S27). It then receives the next input signal $(X_1, Y_1)$ to determine the difference between the this signal and the preceding signal $(X_0, Y_0)$ (S28). The assignment means determines whether or not the difference is, for example, 2 cm or longer (S29), and if so, treats this input as the result of clicking on $(X_0, Y_0)$ (S30). If the difference is shorter than 2 cm, the first signal is moved by the corresponding amount of movement. The above processing between step S26 and step S31 is performed in 0.01 second or shorter.

Figure 20:
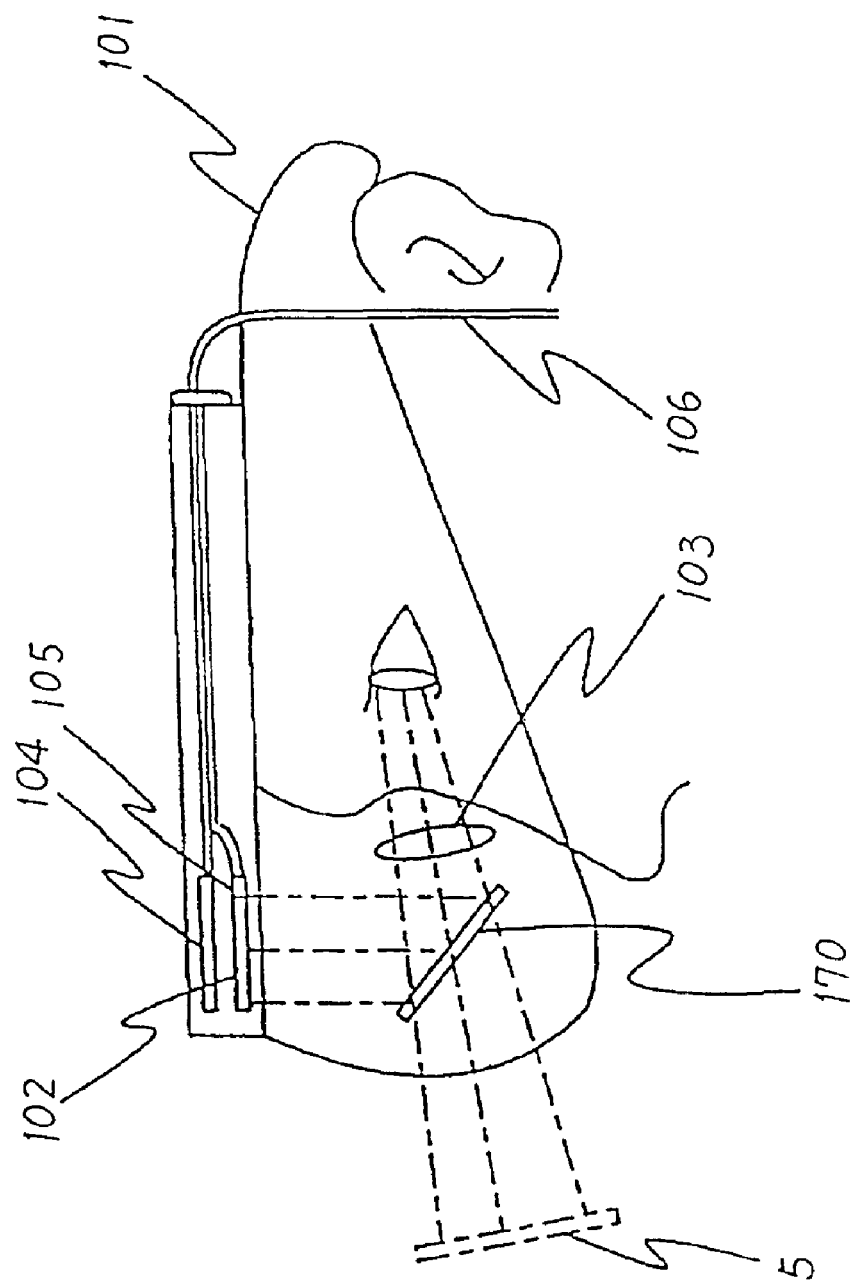
FIG. 20 shows the configuration of the image display device in the embodiment in FIG. 15.

A shown in FIG. 20, in the display device 2 in FIG. 15, one end of the connection cord 106 is connected to the spectacle-like frame 101 for mounting the display device 2 on the operator's head in order to supply image signals and power to the drive circuit 105 and back light 104 disposed in the upper front of the spectacle-like frame 101. An image signal input to the drive circuit 105 is decoded and displayed on the liquid crystal panel 102. The displayed image information is illuminated by the back light 104 disposed on the rear face of the liquid crystal panel 102, and reaches the operator's eyes via a reflection mirror 170 and the enlarging lens 103 located on the front surface of the spectacle-like frame 101 and in front of the respective eyes of the operator. In another aspect, disposing a beam splitter between the liquid crystal panel 102 and the reflection mirror 135 to project an image in two different directions enables the image to reach both eyes of the user via the reflection mirror and the enlarging lens located in front of the respective eyes.

The liquid crystal panel 102 is a long and small full color or monochrome LCD with a screen size of 1 to 2 inches, and allows a virtual subscreen 5 about 14 inches in size to be seen by the user via the enlarging lens 103 at a distance 500 to 1,000 mm apart from the user's eyes, as shown in FIG. 20.

In the above embodiment, although the computer and the display device are separated from each other, the computer may be incorporated in the head-mounted display device, and in this case, signals from the input device are transmitted directly to the head-mounted display device and the computer. This computer may be implemented with an arithmetic operation device designed for a display device.

The interface in the above embodiment for which the key assignment means in the arithmetic operation device executes assignment is not limited to a keyboard but may be a mouse, a joystick, or a pen.

Furthermore, the input device is not limited to a tablet or a data glove as in the above embodiment, various input devices that can detect positional information and on/off information may be connected to the computer.

Figure 16:
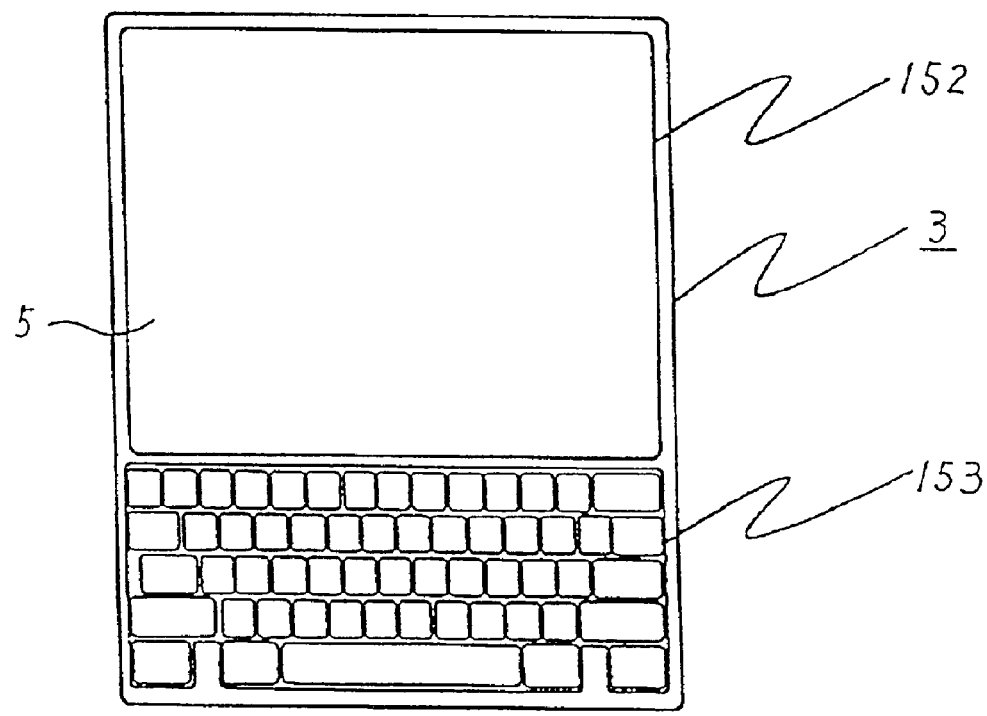
FIG. 16 explains the display screen of the image display device in FIG. 15.

As an alternative to the embodiment shown in FIG. 16, the image synthesizing means in the computer (the arithmetic unit) can be omitted by separately driving and displaying the arithmetic operation result screen and the virtual keyboard display screen to thereby implement the display section of the head-mounted display device.

Embodiment 6

Figure 21:
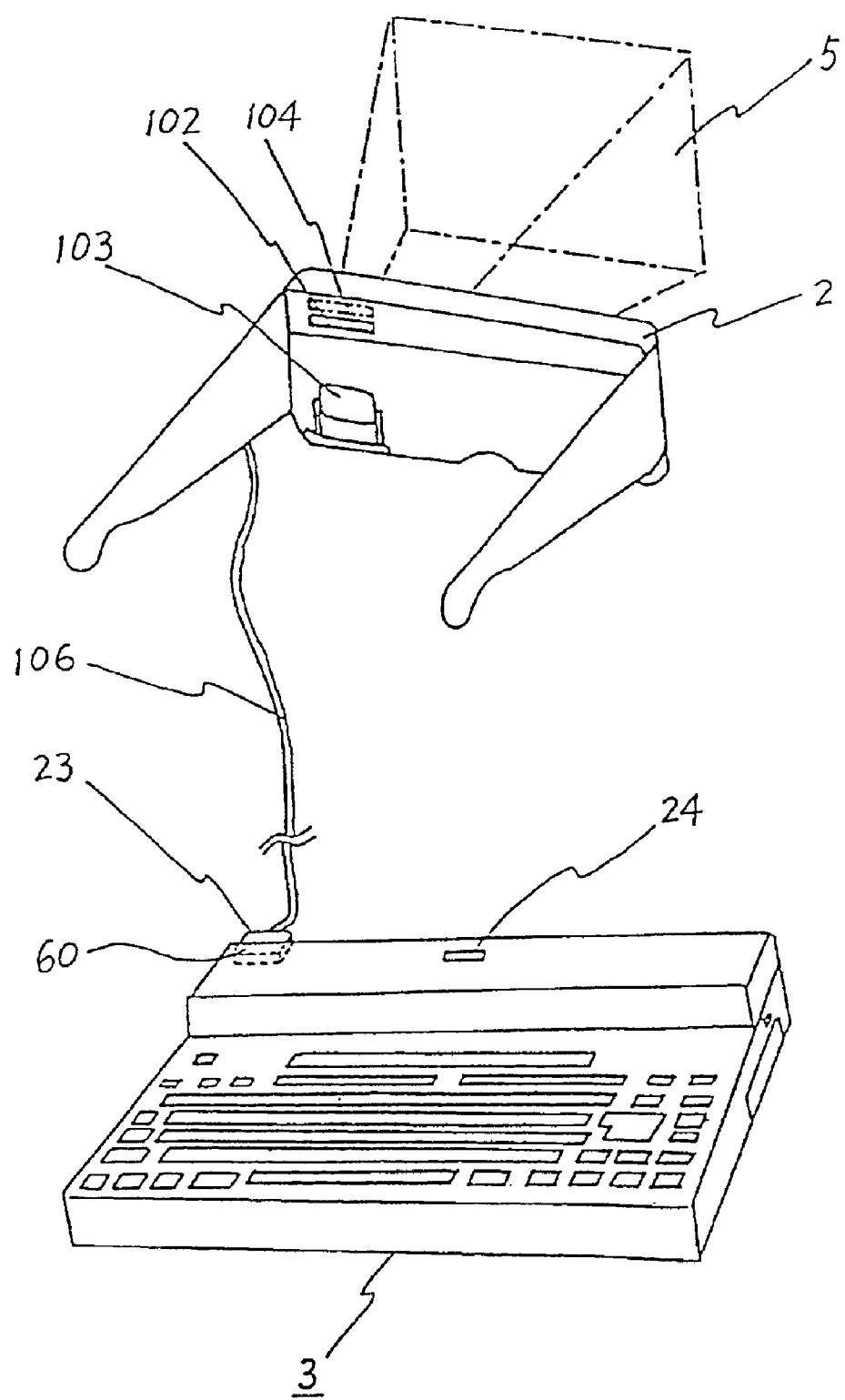
FIG. 21 is a perspective view showing a data processing apparatus, according to one embodiment of this invention, which is used for a personal computer and a spectacle-like display used as a display means that is an example of the head-mounted image display device.

The embodiment in FIGS. 21 to 29 shows the data processing apparatus according to this invention applied to a personal computer. FIG. 21 is a perspective view wherein the display device 2 in the above embodiment is used as the display means. A signal of image display information output from the computer 3 is transmitted to the display device 2 via the connection cable 106. To use the display means separately from the method described below, the cable 106 is connected to the computer 3 via a connector 23 so as to be removed easily therefrom.

The display device 2 in FIG. 21 essentially has the same constitution as the device shown in FIG. 20 except the liquid panel 102 can be removed easily from the frame 101. The reflection mirror 170 can be moved vertically and longitudinally and also have its angle adjusted so that the operator can get a clear view. The frame 101 serves to intercept extraneous light so that the image displayed on the liquid crystal panel 102 can be seen clearly. The exterior, however, must be seen through the frame 101, so the frame 101 preferably has a light transmittance of about 70 to 80%.

In addition, in the embodiment in FIG. 21, power for driving the display device 2 and image information output from the main body are transmitted to the display device 2 via a connector recess 60 provided in the computer 3 main body, a connector convex 23 provided on the display device 2, and the connection cable 106 for connecting the computer 3 main body to the display device 2.

Figure 22:
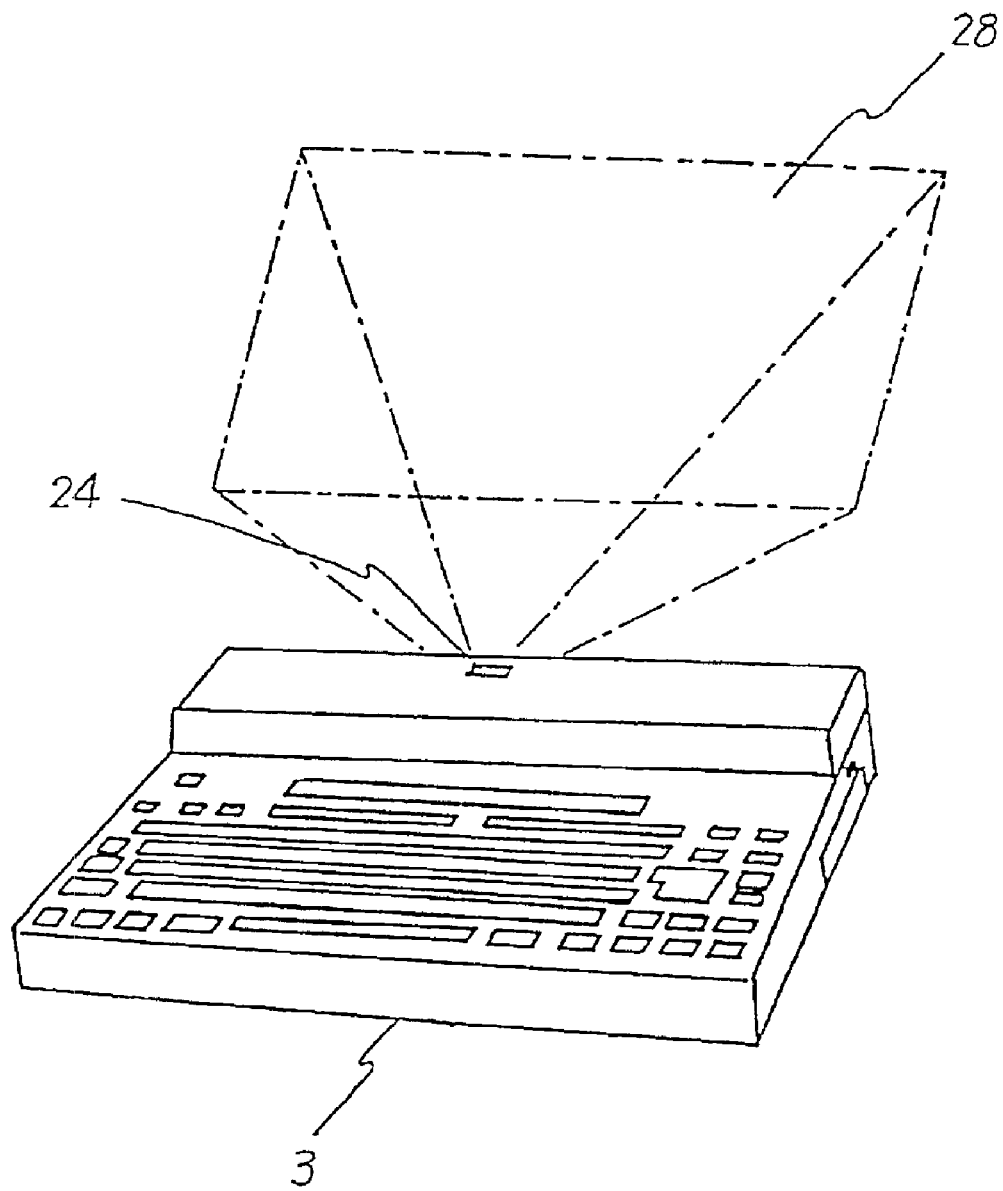
FIG. 22 is a side view showing the details of a head-mounted image display device for the data processing apparatus in FIG. 21.
Figure 23:
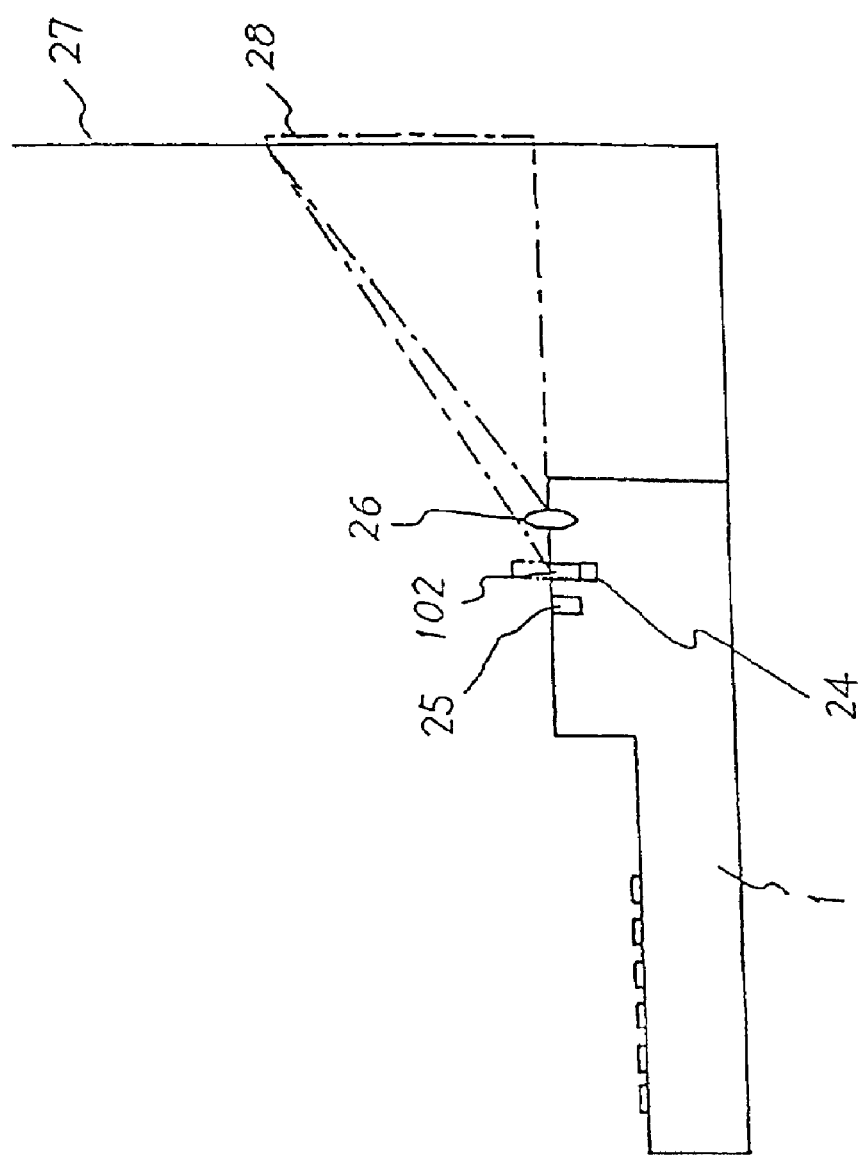
FIG. 23 is a perspective view showing a conventional data processing apparatus in which a main body and a display section can be separated from each other.

FIG. 22 shows a screen used as the display device, and FIG. 23 shows a cross section of the screen.

The liquid crystal panel 102, removed from the display device 2, is plugged in a socket 24. An image displayed on the liquid crystal panel 102 is illuminated by light from the back light 25, enlarged by a lens 206, and projected on a screen 27. As a result, the operator can view the image 28. The vertical position and size of the image 28 can be adjusted by moving the liquid crystal panel 102 vertically or longitudinally in the socket 24. The screen is not necessarily a white panel, but may be a flat surface without patterns such as a wall.

Figure 24:
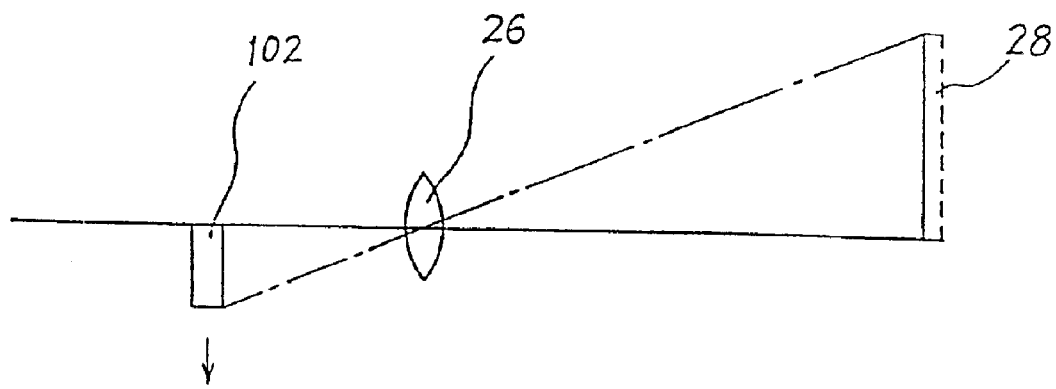
FIGS. 24 and 25 show the relationship between the vertical movement of a liquid crystal display panel and the position of an image.
Figure 25:
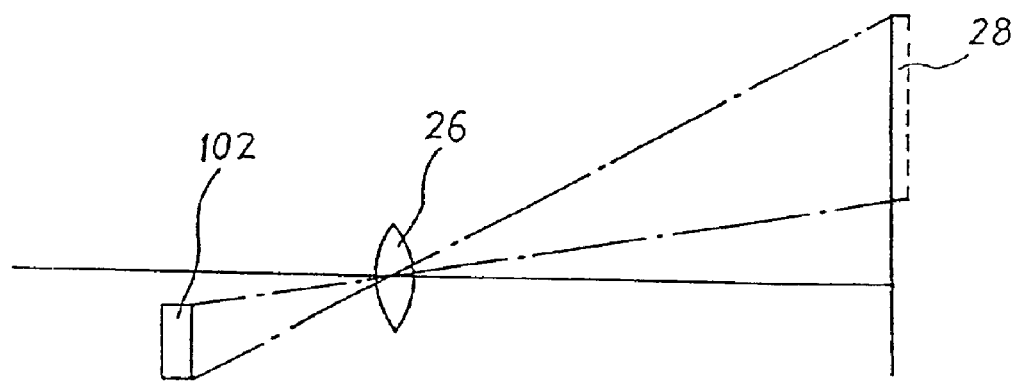

FIGS. 24 and 25 show the correlationship between the vertical position of the liquid crystal panel and the vertical position of the image 28. These figures show that moving the liquid crystal panel 102 vertically enables the vertical position of the image 28 to be adjusted.

Figure 26:
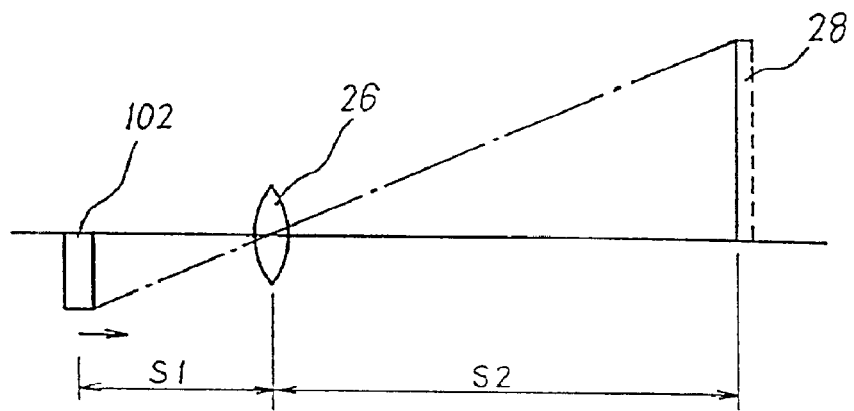
FIGS. 26 and 27 show the relationship between the longitudinal movement of a liquid crystal display panel and the size of an image.
Figure 27:
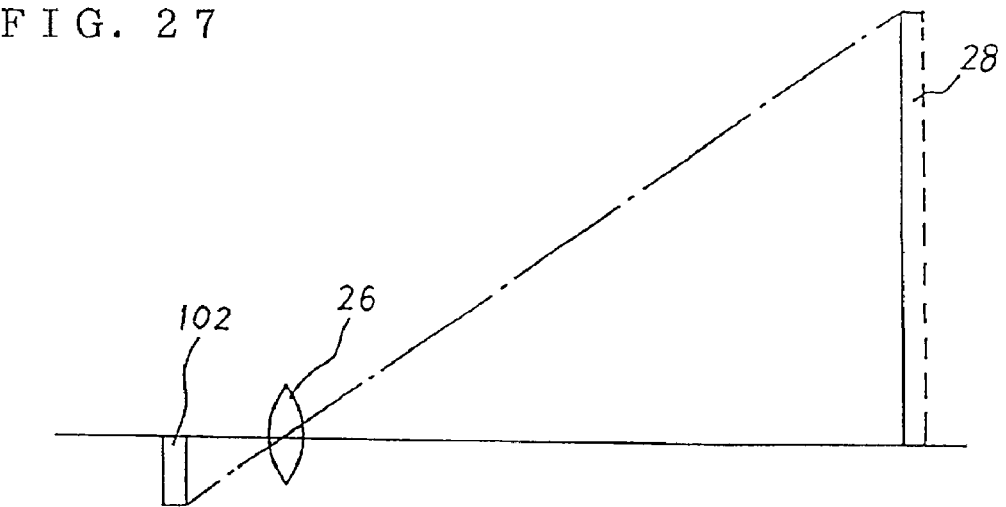

FIGS. 26 and 27 show the correlationship between the longitudinal position of the liquid crystal panel and the size of the image 28. These figures show that moving the liquid crystal panel 102 longitudinally enables the size of the image 28 to be adjusted. When the distance between the liquid crystal panel 102 and the enlarging lens 26 and the distance between the enlarging lens 26 and the screen 27 are referred to as $S_1$ and $S_2$, respectively, expression (1) is given. (f) is a focal length. In addition, when the size of the image is referred to as $\beta$, expression (2) is given.

[Expression1]

$$\frac{1}{S_2} = \frac{1}{S_1} + \frac{1}{f_1}$$

[Expression2]

$$\beta = \frac{S_2}{S_1}$$

In expression (1), $S_2$ increases with decreasing $S_1$, while $S_2$ decreases with increasing $S_1$. Consequently, the size of the image $\beta$ increase with decreasing $S_1$ while it decreases with increasing $S_1$.

Figure 28:
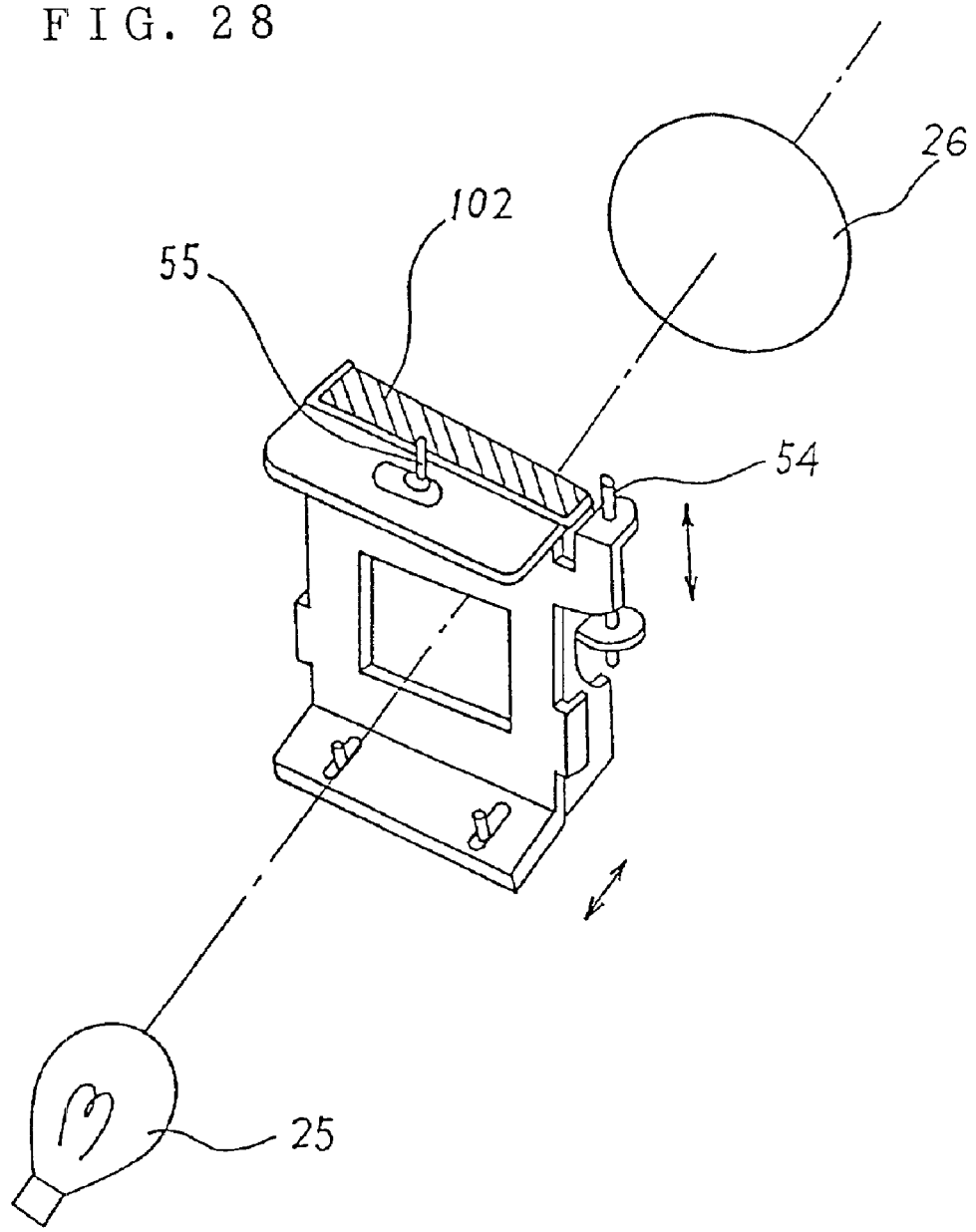
FIG. 28 is a perspective view showing a support mechanism for the liquid crystal display panel.
Figure 29:
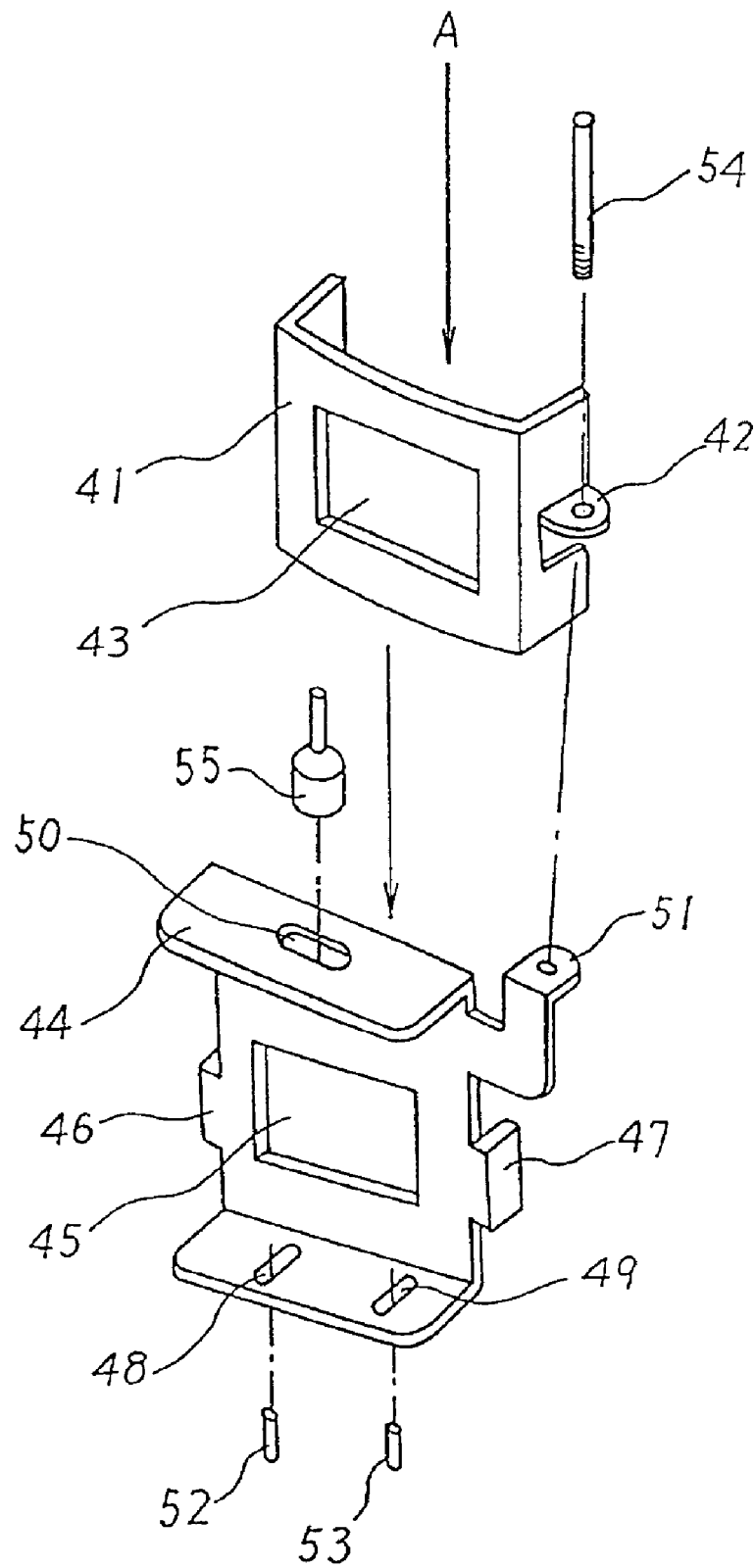
FIG. 29 is an exploded perspective view of FIG. 28.

FIG. 28 shows a perspective view of the structure of the socket 24, and FIG. 29 shows an exploded perspective view of the socket 24.

The liquid crystal panel 102 has its vertical and longitudinal directions adjusted by a pin 54 and an eccentric pin 55, respectively. The liquid crystal panel 102 is inserted in the direction A in FIG. 29. The socket 41 fixes the liquid crystal panel 102. The pin 54 is inserted into a tapped hole 51 via a hole 42 to fix the socket 41 to a socket 44. Thus, the rotational movement of the pin 54 causes the socket 41 to move vertically and thus the liquid crystal panel 102 to move vertically. Pieces 46, 47 of the socket 44 engage the socket 41, and the pieces and the socket 44 are fixed longitudinally together. Rotating the eccentric pin 55 in a long hole 50 enables longitudinal movement. Pins 52, 53 are inserted into long holes 48, 49 to prevent lateral deflection. Windows 43, 45 allow light from a light source to pass through.

Although the above embodiments have shown an example of a liquid crystal panel of a detachable structure, the liquid crystal panel in the display device 2 and the liquid crystal panel in the computer main body can not necessarily be removed from the respective devices, and the liquid crystal panels may be fixed and a display switch is provided to switch the display means for the computer.

In addition, although the above embodiment has referred to the use of a personal computer, this invention is not limited to the above embodiments and is applicable to data processing apparatuses such as word processors. The single eye-type head-mounted display device has been described, but this invention is applicable to double eye-type head-mounted display devices. Furthermore, although the above embodiments have shown the use of a spectacle-type head-mounted image display device, this invention is applicable to other types of head-mounted image display devices such as goggle and helmet types.

If the data processing apparatus of the above configuration is used together with a head-mounted image display device as a display means, only the operator can directly view the contents of display, so the operator can process secret information without caring about people around the operator. The portability of this data processing apparatus is also good because the operator can use the apparatus in a natural position in a limited space as in an airplane or a train. In addition, the field of view can be moved easily between the virtual image viewed through the display device and the exterior including the keyboard, leading to the improved operability of the data processing apparatus.

If a plurality of people desire to simultaneously see image display information output from the data processing apparatus, the liquid crystal panel in the apparatus main body may be used to display image display information on the screen or the like. Such switching of the display means can be carried out easily.

Embodiment 7

Figure 30:
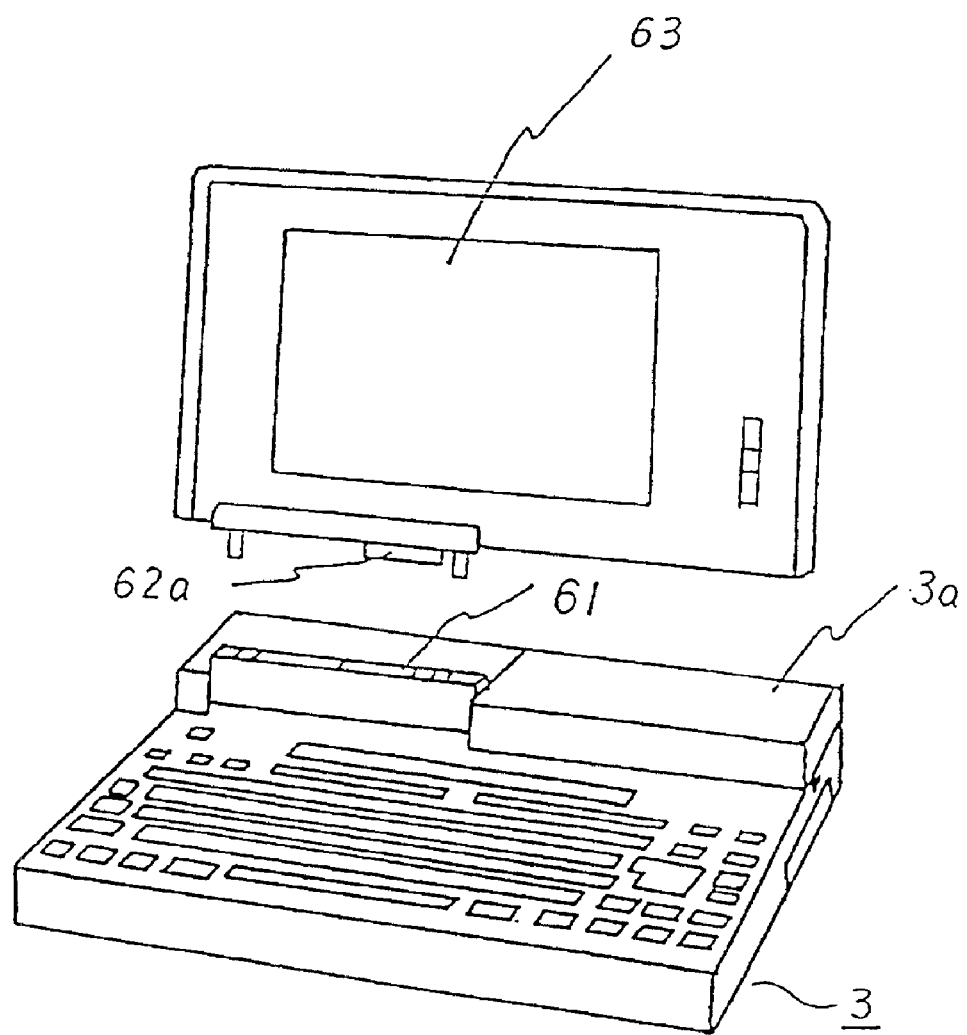
FIG. 30 is a perspective view showing a conventional data processing apparatus in which a main body and a display section can be separated from each other.

FIG. 30 shows a conventional computer in which its display section can be removed from its main body. A computer main body 3a is engaged with a display 63 via a connector recess 61 and a connector convex 62a.

Figure 31:
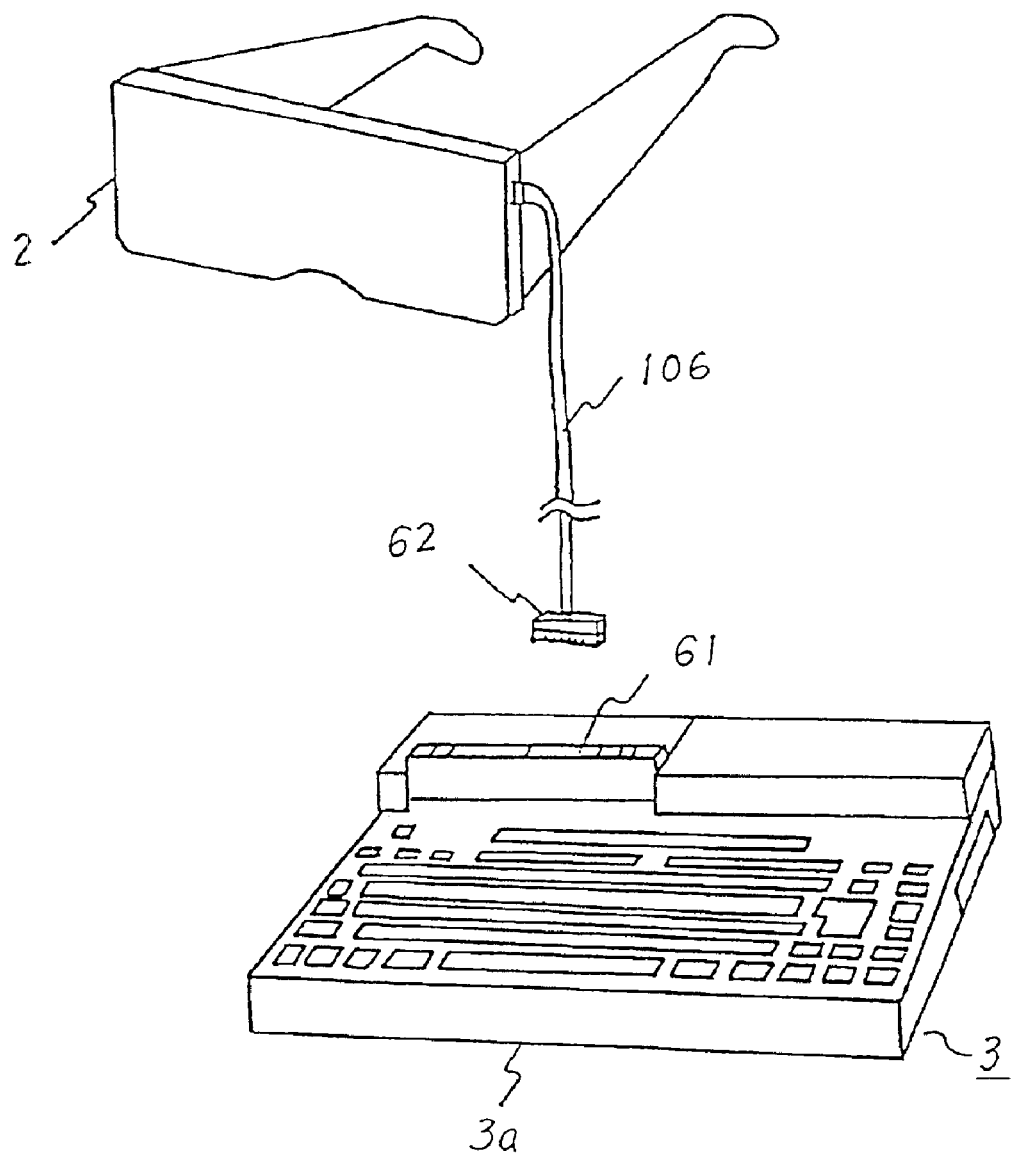
FIG. 31 is a perspective view showing a data processing apparatus to which an image display device according to still another embodiment of this invention can be connected.

FIG. 31 shows an embodiment in which the display device 2 in the above embodiment is mounted on the computer 3 in FIG. 30. In this embodiment, the computer main body. 3a is connected to the display device 2 via the connector recess 61, the connector convex 62, and the connector cable 106.

If both the connector convex 62a of the display 63 in FIG. 30 and the connector convex 62 of the cable 106 in FIG. 31 conform to the same standard, both the conventional display 63 and the display device 2 according to this invention can be connected to the same main body. That is, a data processing apparatus is realized wherein the conventional display 63 and the display device 2 according to this embodiment can be exchanged easily.

Although the above embodiments use a computer as the data processing apparatus, this invention is not limited to these embodiments, and is applicable to other data processing apparatuses such as word processors. The single eye-type head-mounted display device has been described, but this invention is applicable to double eye-type head-mounted display devices. Furthermore, although the above embodiments have shown the use of a spectacles-type head-mounted image display device, this invention is applicable to other types of head-mounted image display devices such as goggle and helmet types.

As is apparent from the above explanation, this embodiment is advantageous in that the display device can be removed easily from the data processing apparatus. In addition, the use of connectors conforming to a common specification enables exchanges between a conventional display and the display device according to this embodiment. Furthermore, the back light in the display device of this embodiment consumes less power than displays used in conventional portable data processing apparatuses. As a result, the life of the battery can be extended, resulting in the significantly improved portability of the data processing apparatus according to this embodiment.

Embodiment 8

Figure 32:
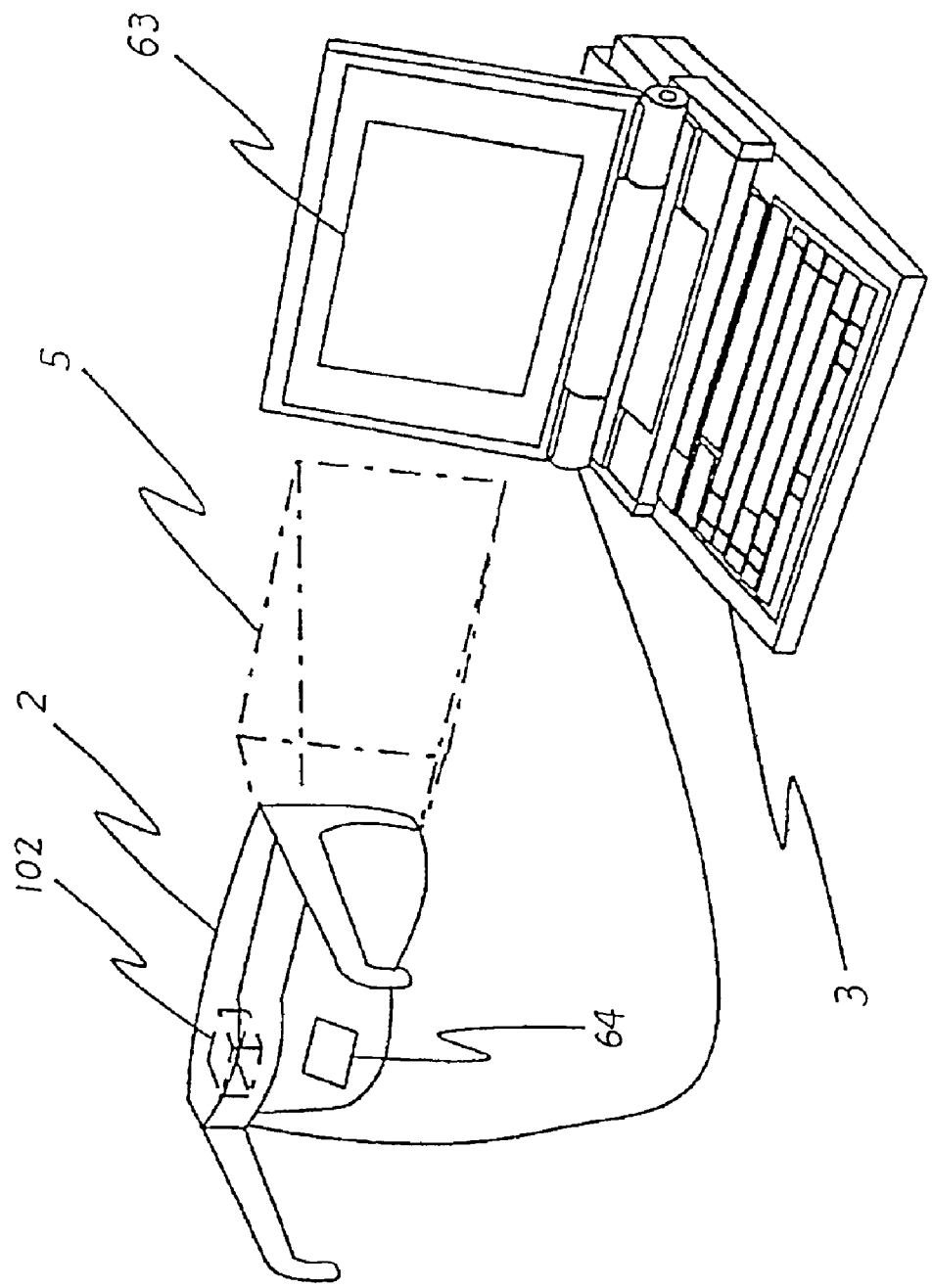
FIG. 32 describes a data processing apparatus according to still another embodiment of this invention.

In the image display system in FIG. 32, output results from the computer 3 are displayed on the display 63 and the display device 2 mounted on the operator's head. The user 1 can execute processing while slightly moving his or her glance to view the image displayed on the display 63 and the virtual subscreen 5 created by the display device 2 mounted on his or her head. The virtual subscreen 5 is generated by allowing an image displayed on the liquid crystal panel 102 to reach the user's eyes via an enlarging reflection mirror section 64.

Figure 33:
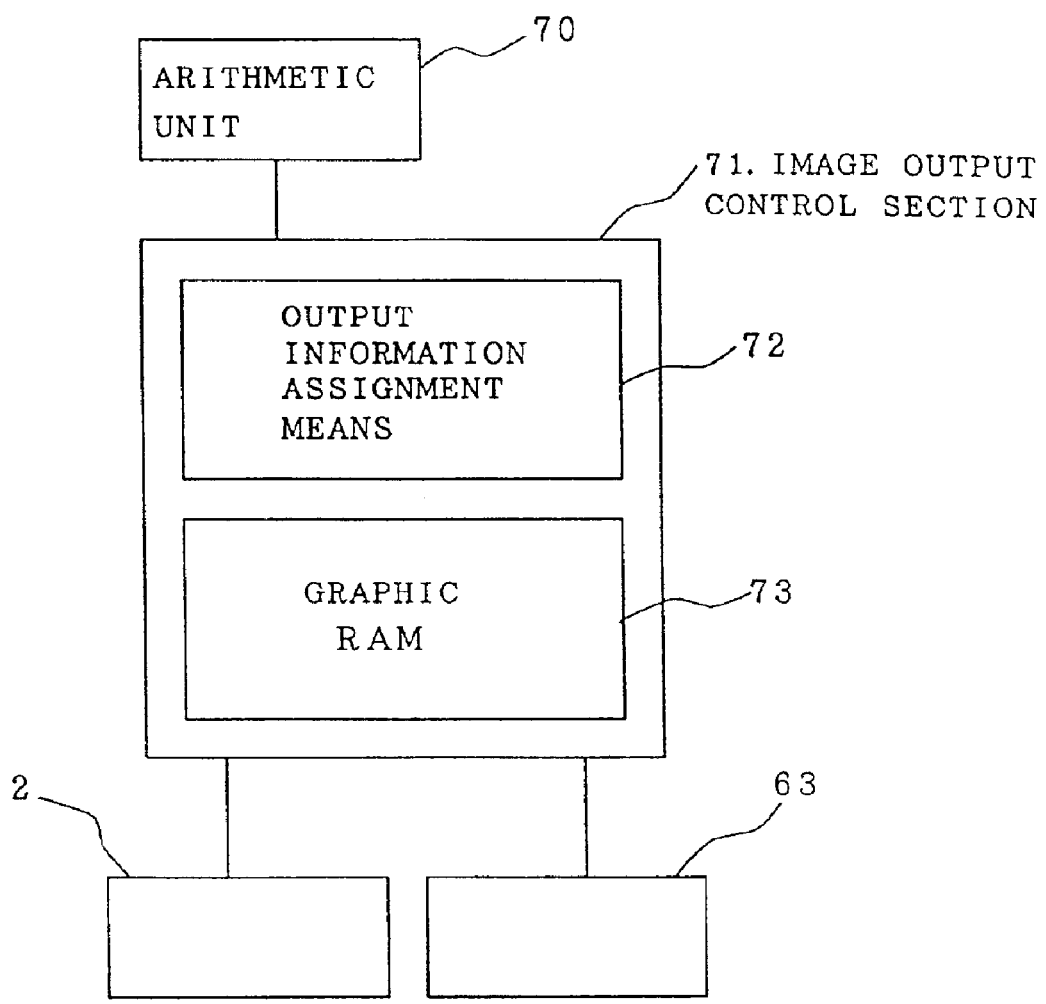
FIG. 33 is a block diagram of a control system in the embodiment in FIG. 32.

In the control system of the display device in FIG. 33, an output image from the arithmetic unit 70 is assigned by an output information assignment means 72 to the respective image output devices for output, and then written to a graphic RAM 73 in an image output control section 71. The information written to the graphic RAM 73 is managed on the basis of addresses, information output from the arithmetic unit 70 is output to the display device 2 and the display 63. For example, the same information may be displayed on both the display device 2 and the display 63, or separate data sets may be displayed on the display device 2 and the display 63, respectively, and the information can also be transferred to an arbitrary image display device.

Figure 34:
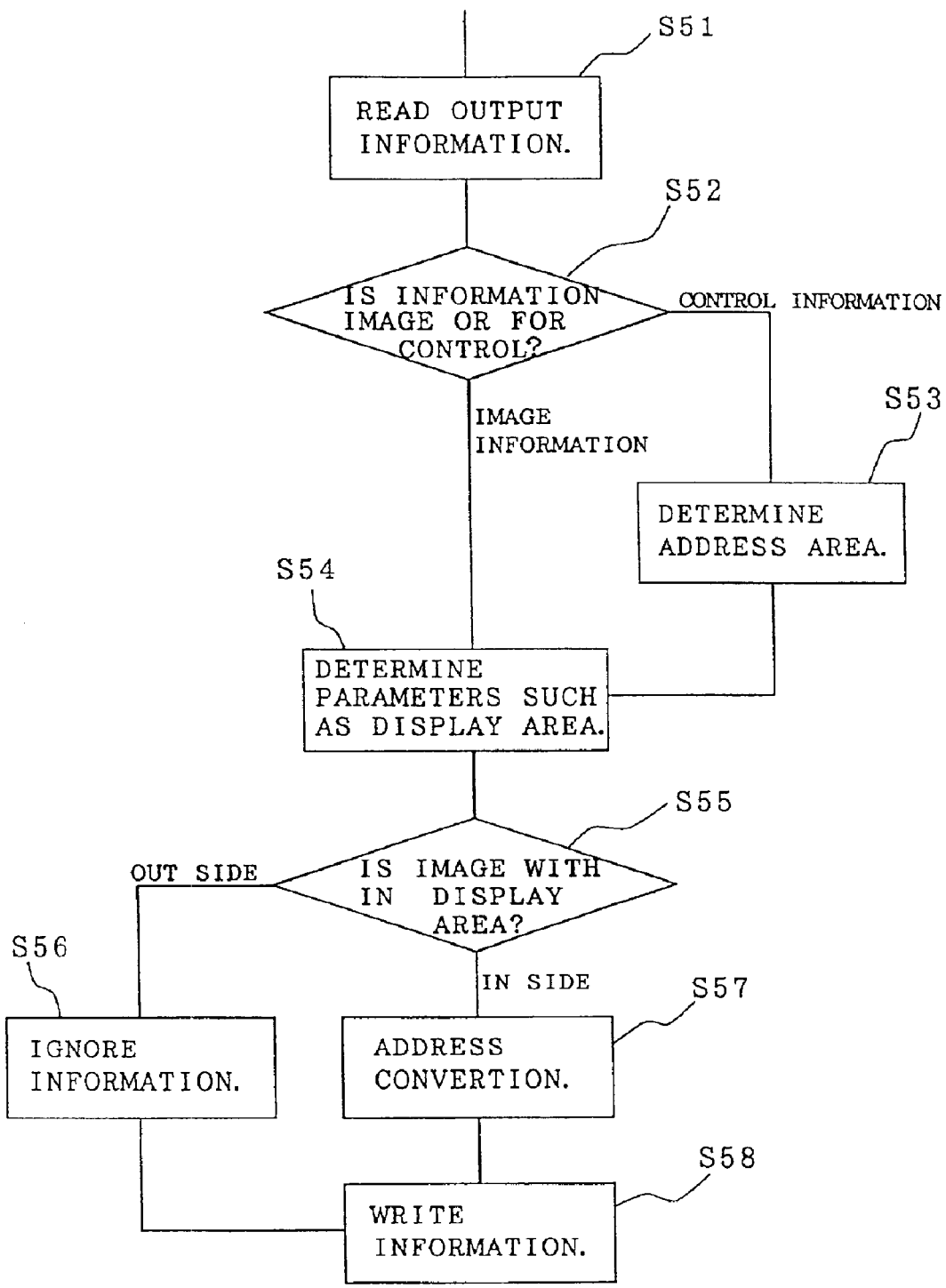
FIG. 34 is a flowchart describing the control system in the embodiment in FIG. 32.

The flowchart in FIG. 34 shows a process of outputting to a plurality of image display devices image information output from the arithmetic unit. As if Image display devices of apparently large capacities were connected to the arithmetic unit, output information from the arithmetic unit is read into these display devices (S51). It is determined whether the read information comprises an image or controls display areas (S52). If the information is to control the display area, a memory address area that must be set in the graphic RAM 73 to display an image on each display device is determined on the basis of this information (S53). If the information comprises an image, parameters such as a display area (addresses) are determined on the basis of the memory address area (S54). It is then determined whether or not the image information should be contained in the display area determined in step S54 (S55), that part of the information which is not associated with the display area is ignored during processing (S56) and the rest of the information which should be contained in the display area is address-converted (S57) and written to the graphic RAM (S58). Each of the image display device displays the information in the assigned address area as required.

The user views the virtual subscreen 5 in part of his or her field of view and the other image display devices in the rest of his or her field of view, and can see the plurality of image display devices simply by slightly moving his or her line of sight.

Although, in the above embodiment, two image display devices are connected to the portable computer, the numbers of arithmetic units and image display devices are not limited, and in a system that processes a large amount of information using a plurality of arithmetic units, the results of processing can be displayed on the plurality of image display devices with only the information to be monitored displayed on a head-mounted display device.

Embodiment 9

Figure 35:
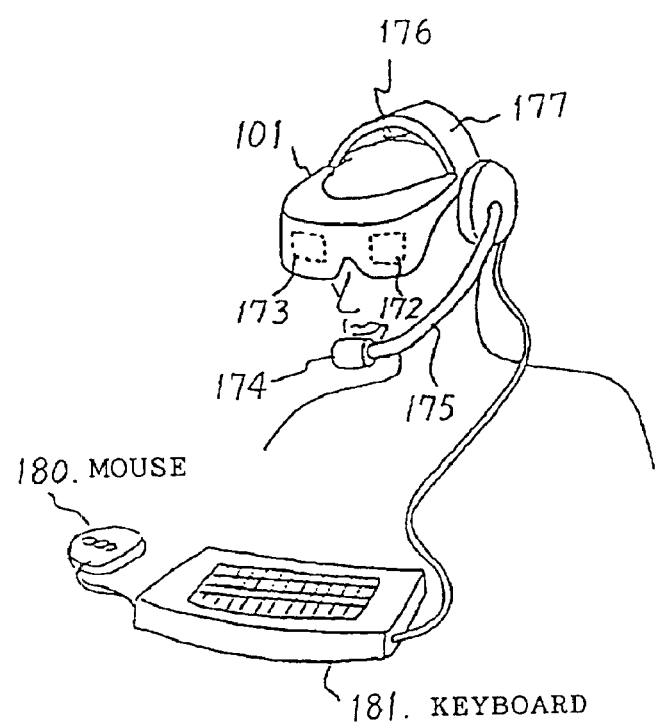
FIG. 35 shows a head-mounted image display device according to still another embodiment of this invention.
Figure 36:
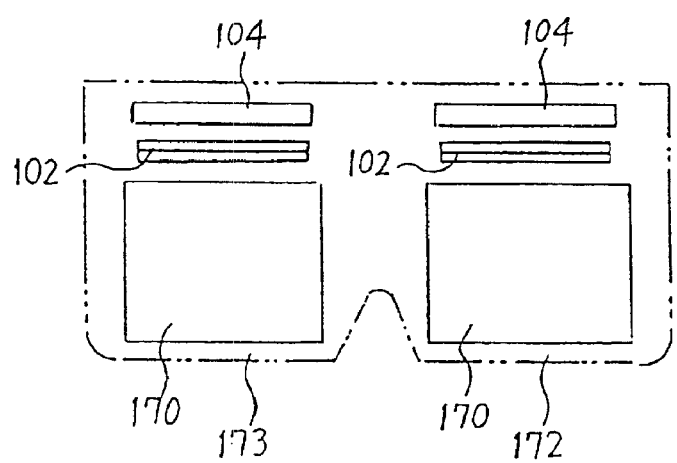
FIGS. 36 and 37 are a front and side views of an optical system respectively in the embodiment in FIG. 35.
Figure 37:
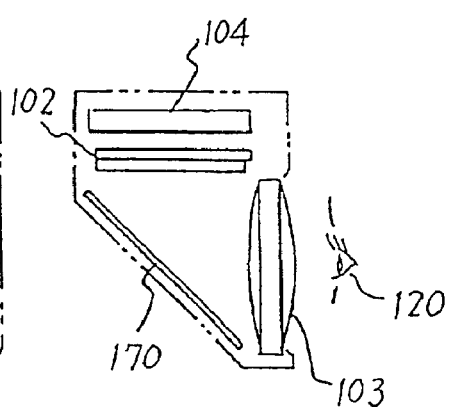

In the display device in FIG. 35, a spectacles-like frame 101 has mounted therein a liquid crystal panel display section 172 for the left eye and a liquid crystal panel display section 173 for the right eye. These liquid crystal panel display sections 172, 173 form a virtual image on the retina of the eyes via a convex lens 103 and a mirror 170 in proportion to the strength of each image by irradiating the rear of the liquid crystal panel 102 from behind with extraneous light or light from the back light 104. A drive circuit for controlling these liquid crystal panels 102 may be configured integrally with or separately from the spectacles-like frame so as to form images on the liquid crystal panel.

A microphone 174 is joined with the frame with a flexible joint 175 that is fixed to the position of the user's ears and which can be bent toward the user's mouth. A tracking sensor 176 that acts as a position detection means is installed in the center of a frame 177 disposed so as to link the user's right and left ears together. The tracking sensor 176 detects the direction of the operator's line of sight using the moment of inertia effected when the user's head is turned. The display device in this embodiment includes a mouse 180 and a keyboard 181.

Figure 38:
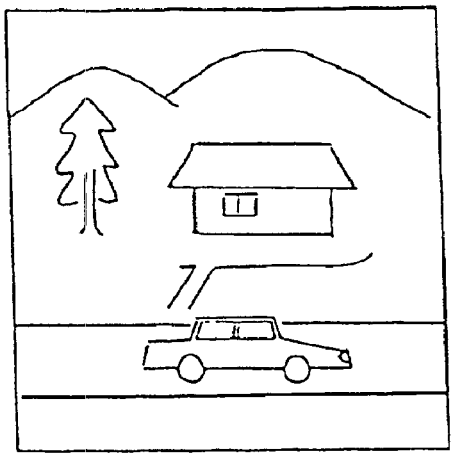
FIGS. 38 and 39 show a display method used when the head-mounted image display device is used to edit still pictures.
Figure 39:
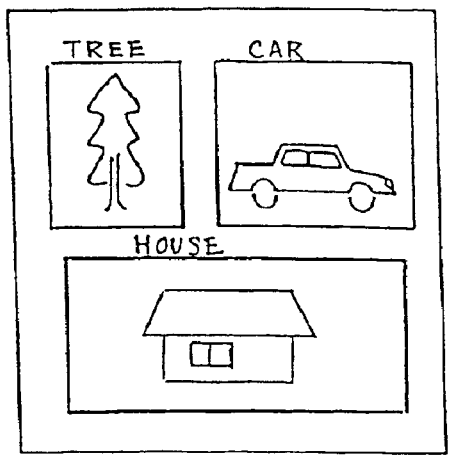

FIGS. 38 and 39 show an embodiment in which a still picture obtained using the display device shown in FIG. 35 is edited. These figures describe a display method in which a first and second display areas are displayed laterally on the display screen.

The first display area usually contains still pictures that are shown in front of the operator. The second display area is displayed on the right of the screen according to the amount of the user's movement detected by the tracking sensor 176 when he or she turns to the right. The second display area displays attributes of the image data shown in the first display area. In this case, when the user turns to the right, the tracking sensor 176 detects this movement to create on the two liquid crystal panels 102 an image such as shown in FIG. 39. This embodiment relates to the synthesis of still pictures, in which the segments of the image (geometric models such as a tree, a house, or a car) are detected on the second display area and have their sizes adjusted. In this case, for example, a "car" is input from the keyboard 181 to search its design file for an appropriate material. Searches are similarly carried out for the house and tree, and the size of the image is also adjusted on the second display area. The processed images materials are transferred to the first display area in which they are synthesized against a background such as a mountain.

Figure 40:
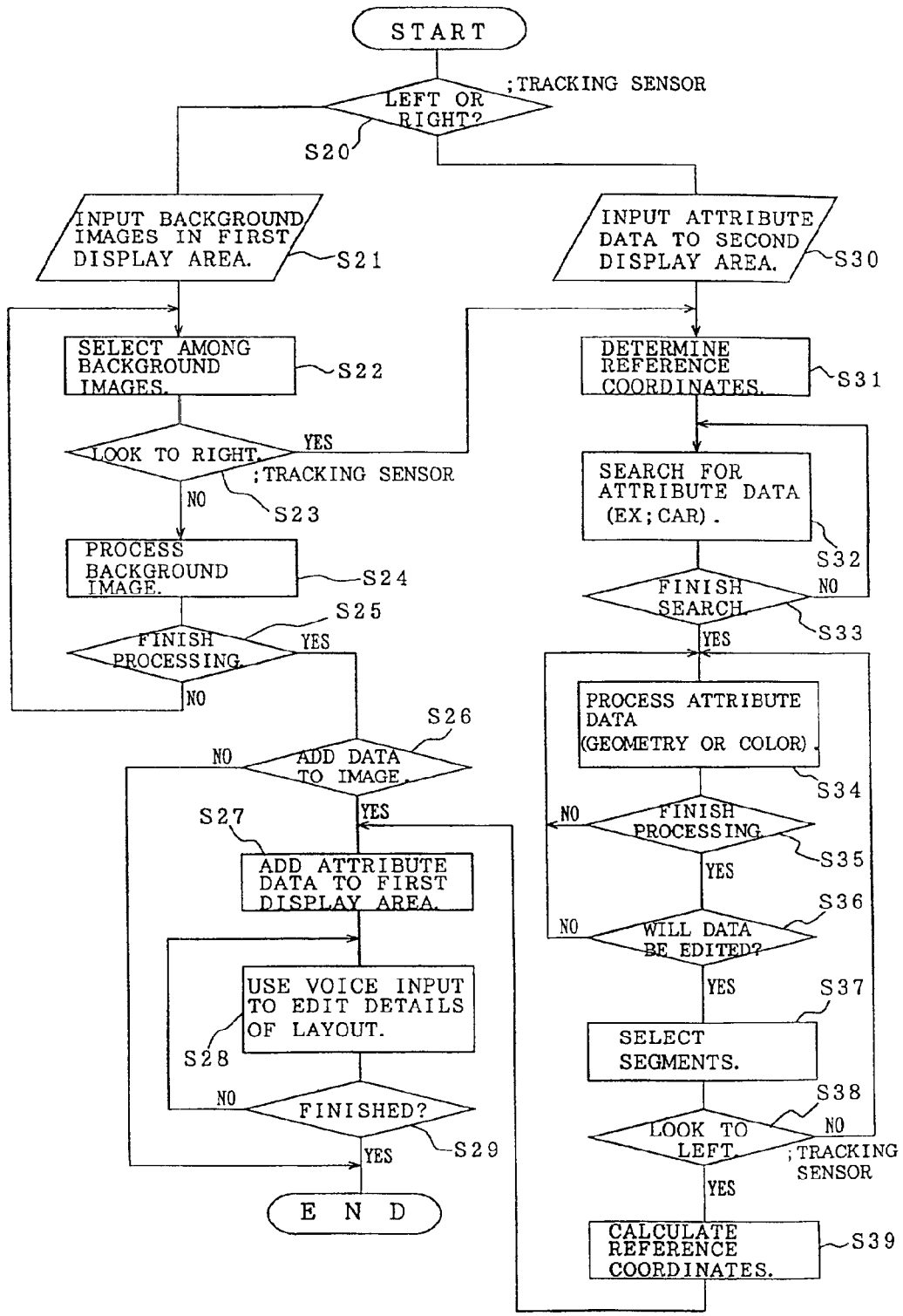
FIG. 40 is a flowchart showing a process executed in the embodiment in FIG. 35.

Next, the above editing process is described with reference to the flowchart in FIG. 40. The output of the tracking sensor 176 is first input, and the direction of the operator's line of sight is detected on the basis of this input signal (S20). If the line of sight is determined to be to the left, background images are input to the first display area (S21) to select among them (S22). It is then determined on the basis of the output of the tracking sensor 176 whether or not the operator 1 has turned to the right (S23), and if not, the background image is then processed (S24). Until the processing is finished (S25), the process of selecting and processing a background images is repeated (S22 to S24).

When the processing has been finished (S25), it is then determined whether or not to add data to the image (S26). If it is determined that data should be added, attributes data is added to the first display area (S27).

Voice input is then used to edit the details of the layout (S28). This process is described later. When the edition is finished (S29), the series of processing is completed.

On the other hand, if the direction of the operator's line of sight is determined to be to the right when the direction of the line of sight is detected (S20), attributes data is input to the second display area (S30). A reference coordinate position is determined (S31), and attributes data is searched for (S32). When the search is finished (S33), the attributes data is processed (S34). When the processing is finished, it is determined whether or not edition will be subsequently carried out (S36). If so, segments to be edited are selected (S37). It is then determined whether or not the operator 1 is looking to the left, and if so, the reference coordinates are calculated (S39) and the process transfers to the above step S27. Otherwise, that is, if the operator is determined to be still looking to the right, the process returns to step S34 to repeat the process of processing attributes data and selecting segments to be edited.

Figure 41:
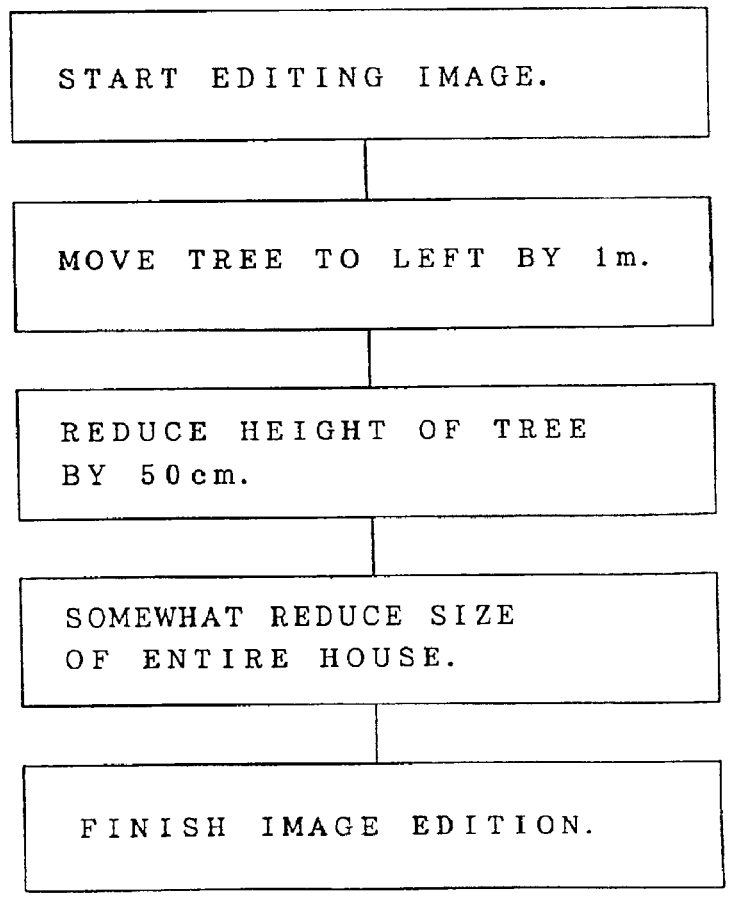
FIG. 41 is a flowchart describing a voice input procedure in the embodiment in FIG. 35.

An audio editing process is described with reference to the flowchart in FIG. 41. Audio input does not simply consist of understanding words implied by commands but employs an audio input means called "WordSpotting" for unspecified speakers in which clauses can be input.

In this audio input means, sentences are understood by neuro-computer processing in which nouns such as a tree, the right side, movement, the left, and a height are registered in advance to understand the entire sentence based on the occurrence probability of each word.

In this case, a virtual image is shown within the first display area via a wide angle lens, so the image is enlarged, and it is possible to allow the user to feel as if he or she were in that image. The distance over which the image moves is set on the computer to the size of the first display area, and the distance between the point of view and an object is calculated, in advance. During edition, a desired image can be input in the form of a voice to edit even minor positional relations while viewing the image in the first display area, without changing the point of view.

The point of view can also be changed in the second display area as if this change were effected by camera work.

FIG. 42 shows a simulation of motion picture data using the display device shown in FIG. 35. A simulated image (a) is displayed in the first display area, while its attributes are displayed in the second display area. The second display area shows spatial area data that varies with the lapse of time, for example, temporally changing and graphed indications of the (b) locus of a flying airplane, (c) its speed, and the (d) hierarchical segmentation of the image segments.

In this embodiment, the locus of the airplane can be obtained by plotting the temporally changing location of the airplane on the second display area. A speed can be set for each plotted point based on the time vs. speed graph. If, for example, the speed is to be varied, the mouse is clicked on each step point to move it upward or downward. The segments that appear in the image data according to a certain time base can be cut or pasted to the image based on the graph in which the image segments are hierarchically expressed.

Such processing enabling the attributes of the image data to be temporally varied is very effective in editing segmented data during postproduction. The efficiency of edition is further improved by applying the depth of each image material and a parallax that corresponds to the difference between the right and left eyes in order to achieve three-dimensional display in which the operator feels as if he or she were viewing actual scenes as well as hierarchical display that expresses the depth well.

Embodiment 10

Figure 43:
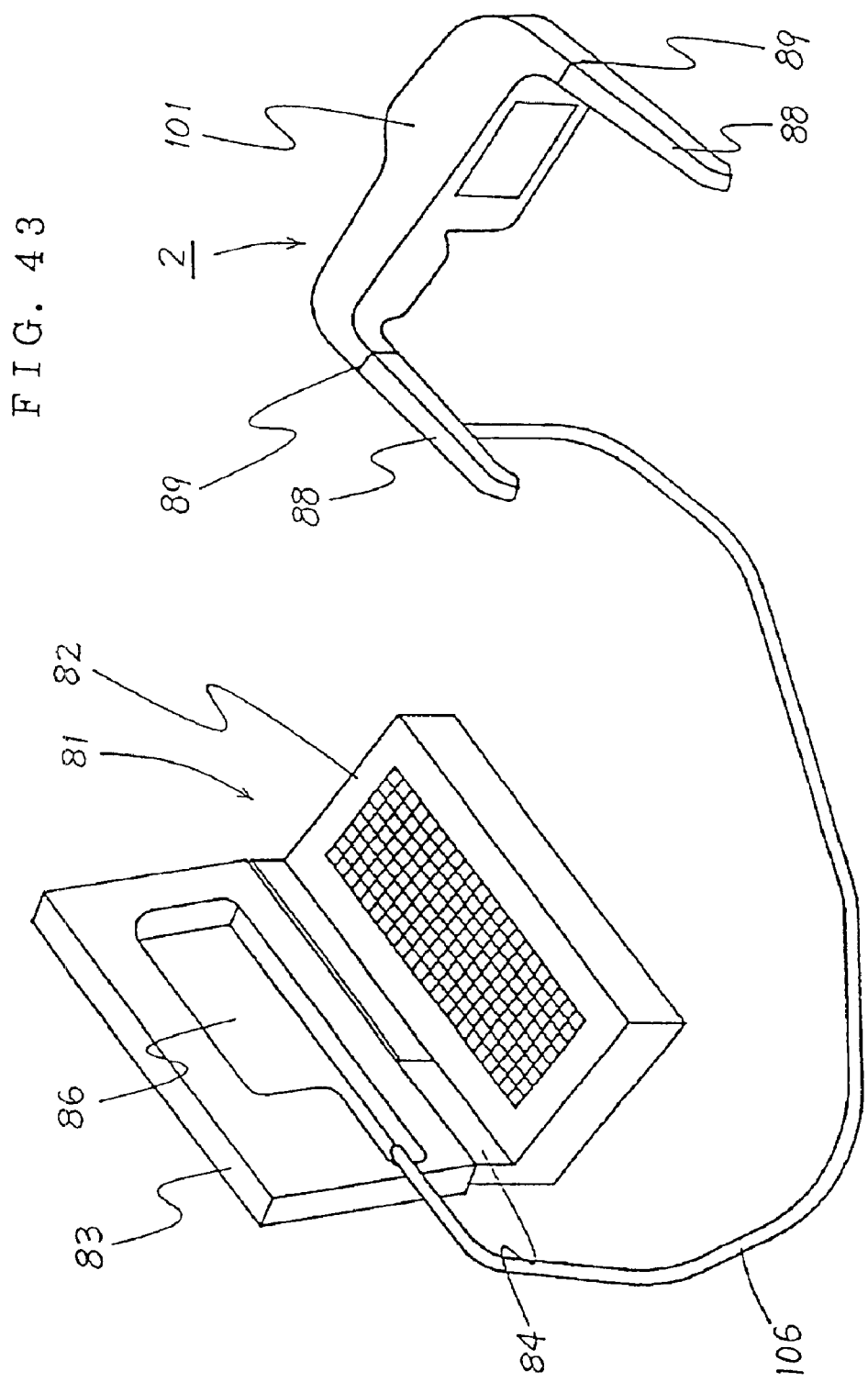
FIG. 43 is a model drawing showing a data processing apparatus according to still another embodiment of this invention.

In the data processing apparatus in FIG. 43, an arithmetic unit 81 is a portable type such as conventional notebook personal computers or personal computers. This arithmetic unit 81, however, does not include a conventional open-type display but comprises an arithmetic unit main body 82 consisting of an arithmetic section, a memory section, and a keypad; and a cover 83 for protecting the upper surface of the keypad during storage or transportation. As in conventional data processing apparatuses, the cover 83 is connected to the arithmetic unit main body 82 via a hinge-like connection 84 so as to be openably and closably retained. The inner surface of the cover 83 has a buffering structure formed of an elastic body, and part of it forms a housing section 86 for housing the display device 2. The display device 2 comprises a spectacles-like frame 101 in which the above optical system and drive circuit are housed, and is mounted on the user's head so as to cover his or her face. A bow 88 is formed at both ends of the frame 101 so as to extend to the user's ears with hinges 89, and can be folded and housed. A communication cable 106 from the drive circuit protrudes from one end of the bow 88 and connects to the arithmetic unit main body 82 through one end of the housing section 86.

In operation, when the head-mounted image display device 2 is fixed to the user's head via the frame 101, and the arithmetic unit 81 is driven, then the drive circuit and the optical system in the display device 2 enlarge an image information output from the arithmetic unit 81 and display it as a virtual image at a definite distance from the operator's face. In storage or transportation, the bow 88 on either side of the display device 2 is folded and the display device is housed in the housing section 86. The communication cable 106 is also folded and housed in the housing section 86, and the cover 83 is closed. This apparatus then constitutes an integral structure like conventional portable data processing apparatuses. Consequently, it is possible to improve the portability and operability of the data processing apparatus while maintaining conventional advantages such as the ability to prepare confidential documents and to avoid locational limitations such as the need to fully open the display.

Figure 44:
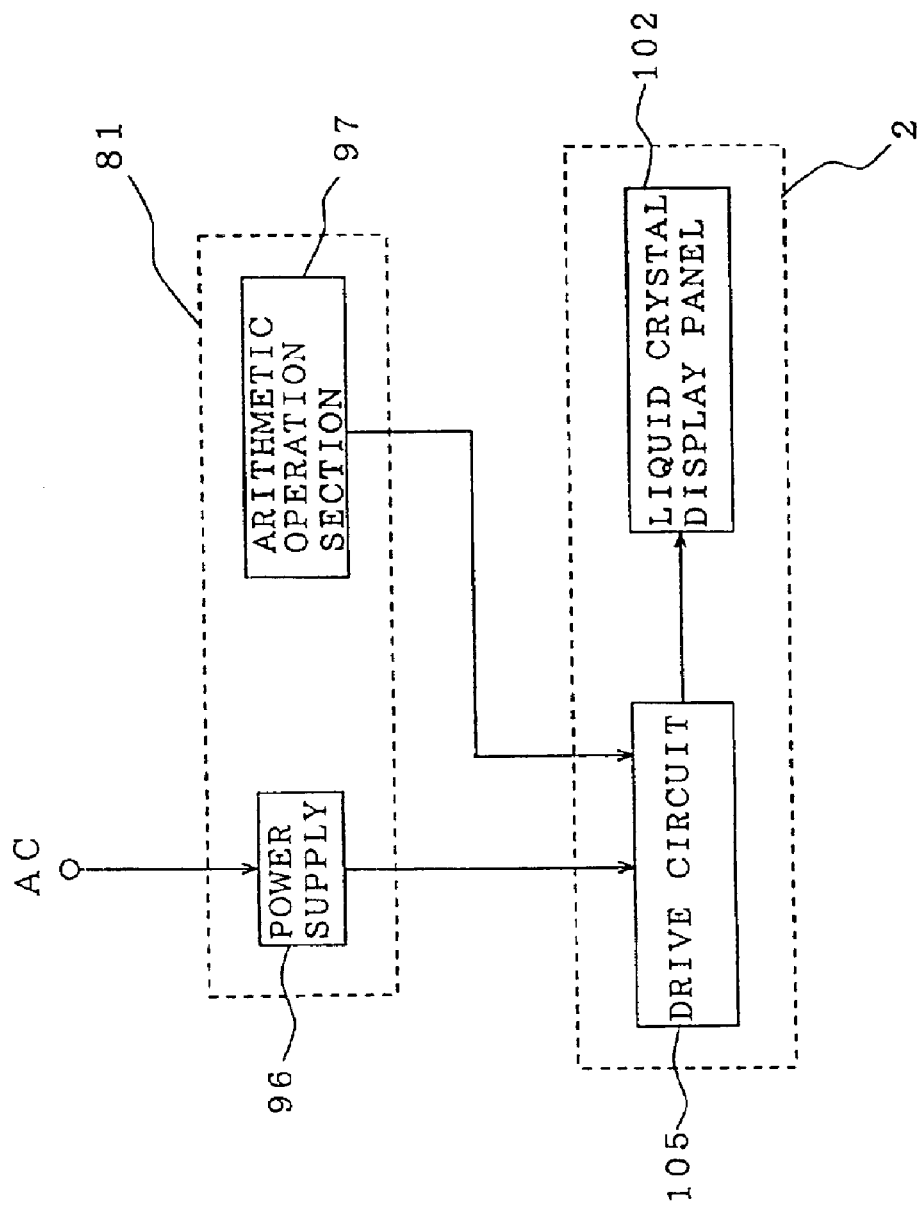
FIG. 44 is a block diagram showing a control system in the data processing apparatus in FIG. 43.

The operation of the above embodiment is explained with reference to the block diagram in FIG. 44. An electric current supplied from an external power supply AC input is allowed to branch into two flows at a power circuit 96 in the arithmetic unit 81, one of which is fed to the arithmetic operation section 97. The other flow and the output of the arithmetic operation section 97 are supplied to the drive circuit 105 in the display device 2 via the connection cable 106, and then converted into a liquid crystal driving signal to drive the liquid crystal panel 102. In this block diagram, components that are not required for the explanation are omitted and are not described. In addition, the size and weight of the display device 2 can be further reduced by dividing the drive circuit 105, which is housed in the display device 2 in this embodiment, into two parts, one of which is incorporated in the arithmetic unit 81 in such a way that this configuration will not result in the occurrence of noise.

Embodiment 11

Figure 45:
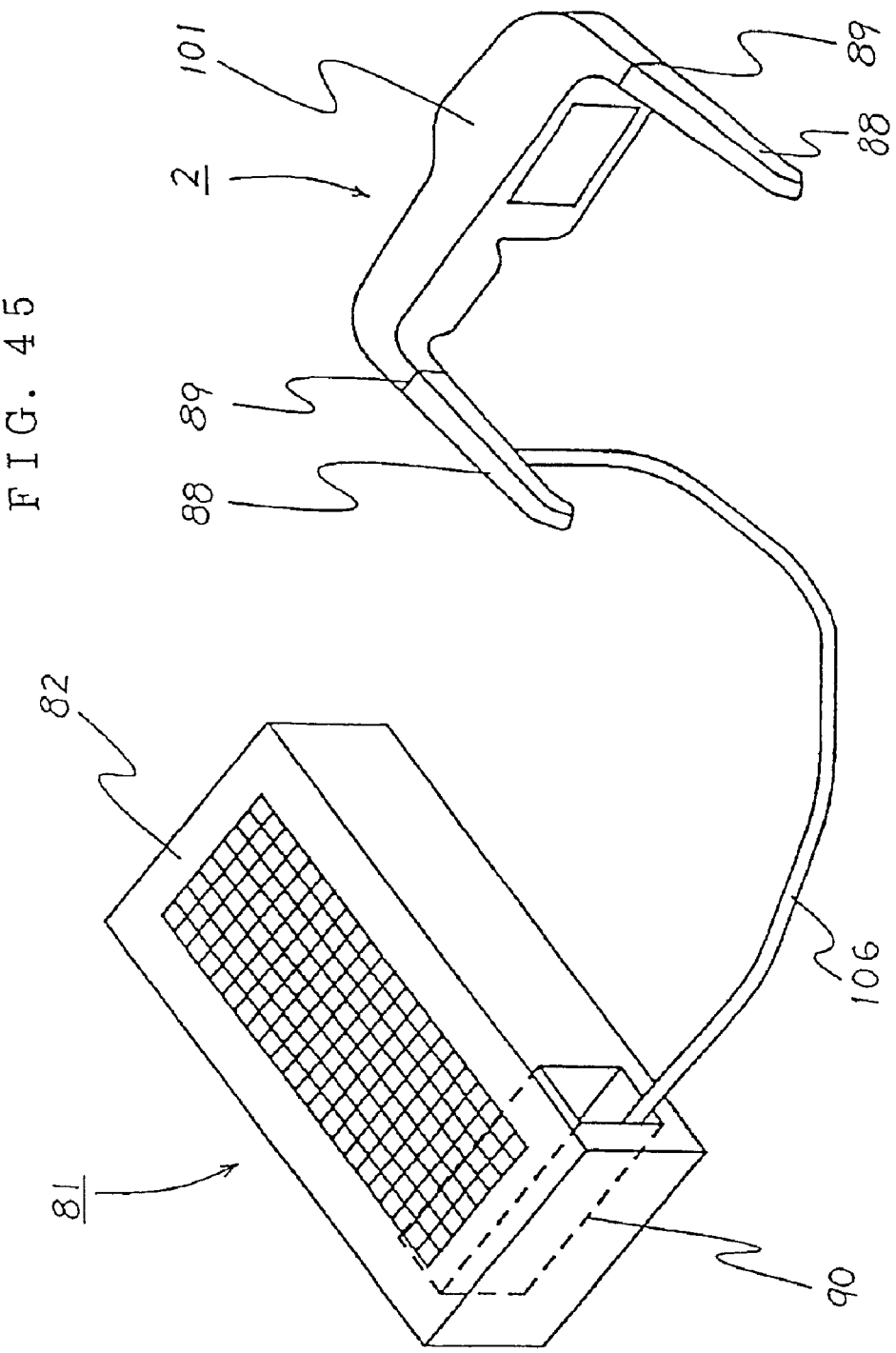
FIG. 45 is a model drawing describing a data processing apparatus according to still another embodiment of this invention.

The data processing apparatus in FIG. 45 has the same basic configuration as in the preceding embodiment. In this embodiment, a housing section 90 for housing the display device 2 is formed inside the arithmetic unit main body 82, and the connection cable 106 is connected to both the power supply in the arithmetic unit 81 and the arithmetic operation section. In this constitution, although the volume of the arithmetic unit main body 82 main body somewhat increases, the need of a large cover is eliminated to reduce the size and weight of the apparatus and thereby improve portability, and the need of an open-type cover is eliminated to reduce the locational limitations, thereby further improving usability.

Embodiment 12

Figure 46:
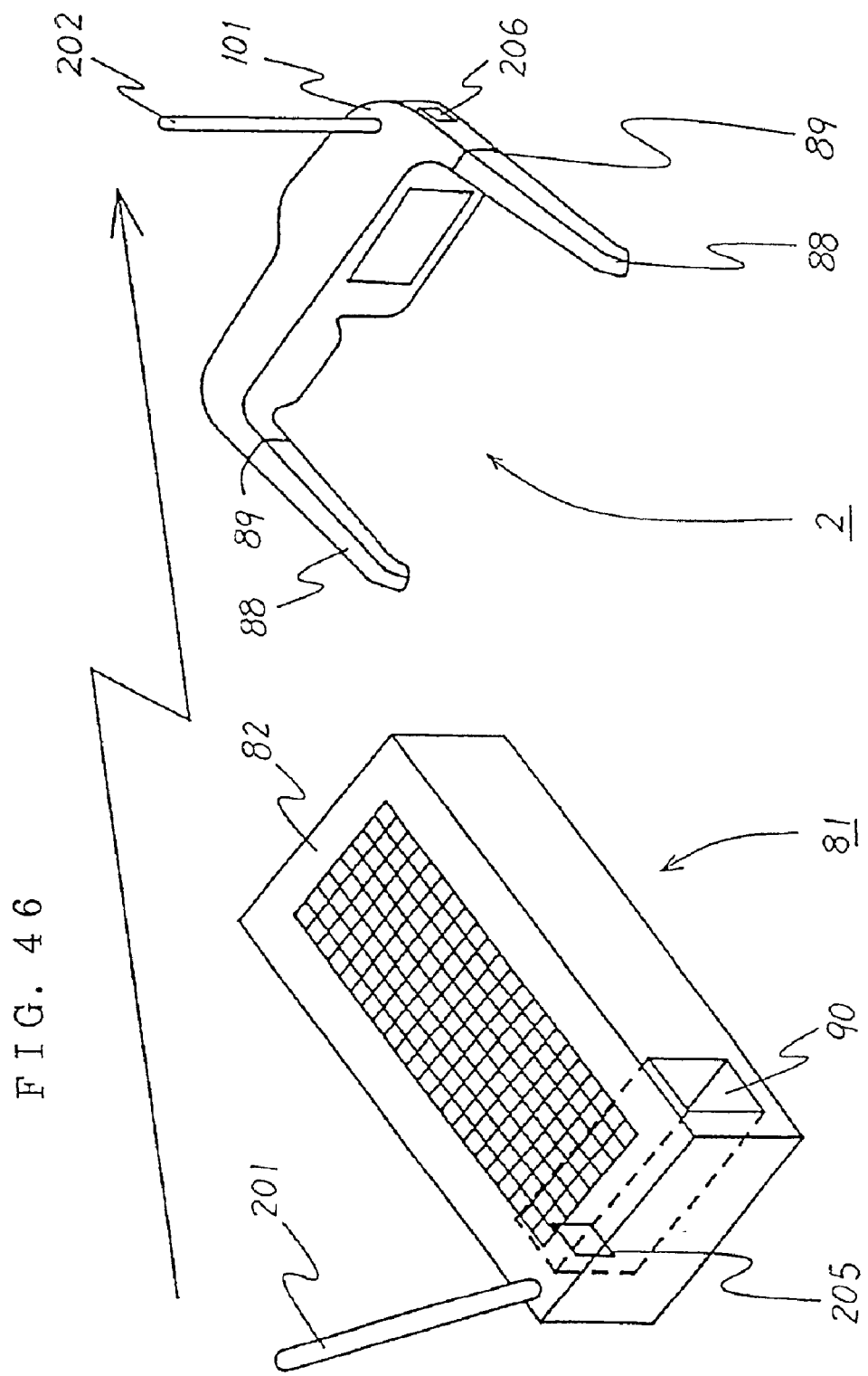
FIG. 46 is a model drawing describing a data processing apparatus according to still another embodiment of this invention.
Figure 47:
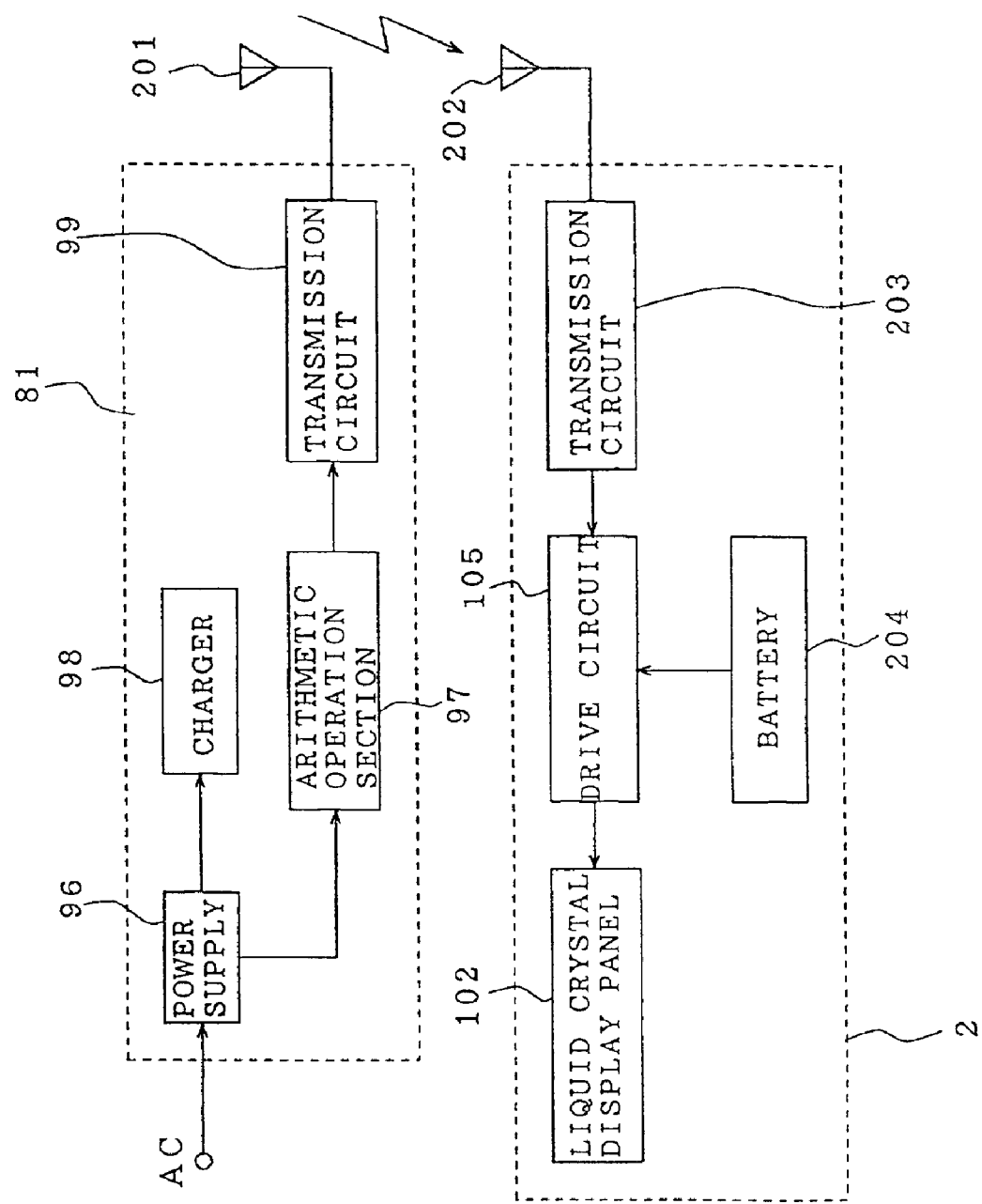
FIG. 47 is a block diagram showing a control system in the data processing apparatus in FIG. 46.

The data processing apparatus in FIGS. 46 and 47 also has the same basic configuration as in the two preceding embodiments. Like components carry like reference numerals, and their description is thus omitted.

In this embodiment, the arithmetic unit 81 has a charger therein, and the display device 2 has a chargeable battery therein. In addition, the arithmetic operation section 97 and the drive circuit 105 communicate with each other by radio. The use, storage, or transportation of this apparatus thus requires a smaller space. The arithmetic unit 81 has a charger 98 to which electric currents are supplied from a power supply 96 and a transmission circuit 99 to which signals are delivered from the arithmetic operation section 97. A signal supplied to the transmission circuit 99 is modulated in the circuit 99, then transmitted and received via antennas 201, 202, and demodulated in a receive circuit 203. The signal is finally input to the drive circuit 105. The display device 2 has a chargeable battery 204 therein for delivering drive currents to the drive circuit 105.

An electrode contact 205 connected to the charger 98 is exposed on the end face of the housing section 90. If, for example, the head-mounted image display device 2 is to be housed in the housing section 90 by inserting the antenna 202 side into the section 90, an electrode contact 206 is provided at the antenna 202 side end of the frame 101 that engages the electrode contact 205 when the display device is housed in the main body, and connected to the battery 204. In this configuration, when the head-mounted image display device 2 is housed in the main body, the electrode contact 205 of the charger 98 and the electrode contact 206 of the battery 204 are connected together. The battery 204 is thus charged while the display device 2 is housed in the main body, that is, while the device 2 is out of use.

In this constitution, the arithmetic unit 81 and the display device 2 are completely separated from each other, thereby substantially simplifying the use of the data processing apparatus 81 as well as the mounting and removal of the display device 2 from the housing section 90. In addition, even when the display device 2 is housed in the same manner as in the embodiment in FIG. 43, similar effects can be produced by adding the above components to the apparatus.

The display device in each of the above embodiments need not necessarily be of a single eye type in which an optical system is disposed over only one eye while the other eye views an image, but may be of double eye type in which an optical system is disposed over each eye. In this case, the optical axis of each optical system is preferably directed inward so that the glances of the two eyes intersect each other at an image visible distance (a distance at which a virtual image can be perceived), as in the natural way of looking at objects. In addition, the above components are not limited to the above contents, and various modifications may be made thereto without departing from the spirit of this invention.

What is claimed is:

1. A head mount image display device wherein a liquid crystal display panel and enlarging optical system are housed in a frame and wherein an image generated on the liquid crystal panel is visible in a field of view in front of said frame through the enlarging optical system, said device comprising:

an input device for inputting signals, with a positional sensor to detect positions of an operator's hands and fingers;

a key assignment means for assigning input keys to information regarding the positions detected by said positional sensor;

an arithmetic unit for performing arithmetic operations based on data corresponding to an input key assigned by said key assignment means;

an image synthesizing means for synthesizing a virtual key board display screen for displaying input keys to be assigned by said key assignment means, and an arithmetic operation result display screen for displaying a result of the arithmetic operation performed by said arithmetic unit, so as to display both said display screens side by side on one screen.

2. An image display device according to claim 1, comprising a voice input means connected to said frame.

* * * * *